United States Patent [19]

Nishimura et al.

[11] Patent Number: 5,412,418
[45] Date of Patent: May 2, 1995

[54] PICTORIAL COMMUNICATION APPARATUS

[75] Inventors: Toshihiro Nishimura; Toshio Hayashi, both of Fukuoka; Hirotaka Kawano, Ogoori; Hideshi Fujiki, Kasuga, all of Japan

[73] Assignee: Matsushita Electric Industrial Co., Ltd., Japan

[21] Appl. No.: 276,619

[22] Filed: Jul. 18, 1994

[30] Foreign Application Priority Data

Jul. 20, 1993 [JP] Japan ............................. 5-179000

[51] Int. Cl.6 ............................................. H04N 7/14
[52] U.S. Cl. ..................................... 348/14; 348/17
[58] Field of Search .................................. 348/14–18, 348/469, 552; H04N 7/14; 379/53

[56] References Cited

U.S. PATENT DOCUMENTS

| 4,533,943 | 8/1985 | Poirier | 348/14 |
| 4,943,994 | 7/1990 | Ohtsuka et al. | 348/17 |
| 5,018,186 | 5/1991 | Kimura et al. | 348/18 |

FOREIGN PATENT DOCUMENTS

| 2-048887 | 2/1990 | Japan . | |
| 3-216091 | 9/1991 | Japan . | |
| 4-179357 | 6/1992 | Japan . | |
| 405122390 | 5/1993 | Japan | 348/14 |
| 405207166 | 8/1993 | Japan | 348/14 |
| 406070050 | 3/1994 | Japan | 348/14 |

Primary Examiner—Victor R. Kostak
Attorney, Agent, or Firm—Parkhurst, Wendel & Rossi

[57] ABSTRACT

A first pictorial communication apparatus for transmitting and receiving a pictorial signal and a sound signal through a first channel and a control message through a second channel, having a line interface for communicating with ISDN, a video codec portion for coding and decoding of the pictorial signal, a key input portion and a camera, further comprises a character storing portion for storing character codes in corporation with the key input portion, a data conversion portion for converting character data train read from the character storing portion into a character video signal. On arrival of a call in an automatic answering mode, the character data train is read and transmitted through the first channel in place of a video signal from the camera after the conversion. The second apparatus has similar structure. A called second apparatus transmits the character code data train included in the control message through the second channel in the automatic answering mode on the arrival of call without the conversion. The called apparatus detects the character code data train from the control message and indicates the character code data train as an answering message after conversion by the data conversion portion.

38 Claims, 18 Drawing Sheets

PICTORIAL COMMUNICATION APPARATUS

BACKGROUND OF THE INVENTION

1. Field of the Invention

This invention relates to a pictorial communication apparatus for transmitting and receiving a moving or still image and a sound through a communication line.

2. Description of the Prior Art

A pictorial communication apparatus (visual telephone) for transmitting and receiving a moving or still image and a sound through a telephone network is known. FIG. 17 is a block diagram of a prior art pictorial communication apparatus. Numeral 101 is a camera for taking a picture of a user, numeral 102 is a monitor for displaying an image sent from the communication partner or from the camera 101, numeral 103 is a handset having a microphone for receiving a sound and a speaker for outputting a sound. Numeral 104 is a video codec portion for compressing and coding video data obtained from the camera 101 in a predetermined format and expanding and decoding compressed and coded data to display the image on the monitor 102. Numeral 105 is a sound codec portion for compressing and coding a sound signal from the microphone of the handset 103 and expanding and decoding compressed and coded sound data to output a sound from a speaker of the handset 103. Numeral 106 is a multiplex and demultiplex portion for effecting multiplexing, i.e. combining the video data and sound data compressed and coded by the video codec portion 104 and the sound coding portion 105 respectively and for separating a multiplexed signal into the video data and the sound data to supply the video data and the sound data to the video codec portion 104 and the sound codec portion 105 respectively. Numeral 107 is a line interface portion having functions of analyzing a message signal received from the ISDN (Integrated Services Digital Network) 110, judging a kind of a message (such as a setup, a answer, and a disconnection message or the like), judging whether the signal which will be sent is a pictorial communication signal or other signal, and sending a various message on the communication line in addition to the conventional function making connection with the line. Here, the setup message is a message sent from a terminal on a calling side and includes setting information of various calling conditions and a kind of a transmitted signal (such as a pictorial communication signal, a telephone signal or the like). Numeral 108 is a key input portion having a key board and hook key or the like. Numeral 109 is a control portion for effecting a total control for the whole pictorial communication apparatus in response to the inputs form the key input portion 108 for controlling of sending of a answer message from the line interface 107 and an outputting control of a calling bell 111.

FIG. 18 shows a flow chart showing an operation of the prior art pictorial communication apparatus shown in FIG. 17. Hereinbelow an operation of the prior art pictorial communication apparatus shown in FIG. 17 will be described with reference to the flow chart shown in FIG. 18.

At first, the line interface portion 107 detects an arrival of a call by receiving a setup message from the ISDN 110 in step 201. The setup message is analyzed in step 202 and a decision is made as to whether or not the kind of a transmission signal included in the setup message is a pictorial communication signal in step 203 or the message indicates a visual telephone call. If the answer is NO, other processings are executed in step 207. If the answer is YES, that is, it indicates the pictorial communication signal, information of the arrival is sent to the control portion 109. In response to the information of the arrival, the control portion 109 operates the bell 111 to producing a call sound in step 204. Then, when a hook switch becomes in the off-hook condition, the control portion 109 detects the off-hook condition in step 205 and operates the line interface portion 107 to send an answer message. In response to the control portion 109, the line interface portion 107 sends the answer message through the ISDN 110 in step 206. A line interface portion 107 of a pictorial communication apparatus on the calling side received the answer message from the ISDN 110 and analyzes the answer message and confirms a permission message from the called party included in the answer message. This completes the operation of connection between the calling party and called party.

After completion of the connection, communication will start.

Transmitting operation will be described.

A video signal from the camera 101 and a sound signal from the microphone of the handset 103 are compressed and coded by the video codec portion 104 and the sound codec portion 105 respectively. The sound signal and the video signal compressed and coded are multiplexed by the multiplexing and demultiplexing portion 106 to supply a multiplexed signal to the line interface portion 107. The line interface portion transmits the multiplexed signal to the ISDN 110.

Receiving operation will be described.

A transmitted signal (multiplexed signal) through the ISDN 110 is received by the line interface 107 and is supplied to the multiplexing and demultiplexing portion 106. The multiplexing and demultiplexing portion 106 separates the received multiplexed signal into a video signal and a sound signal. These signals are supplied to the video coding portion 104 and the sound codec portion 105 respectively and are subjected to expansion and decoding there. The expanded and decoded video and sound signals are outputted by the monitor 102 and the speaker of the handset 103 respectively.

Another prior art pictorial communication apparatus has a video RAM for storing video and voice messages in addition the structure substantially the same as the first mentioned prior art. When a user is absent, in response of an arrival of a call, it sends the video and sound message to the caller which were recorded previously. After this, it can receive and record an answer message from the caller in the RAM. However, in this prior art pictorial communication apparatus, there is a problem that the cost of the RAM is high.

SUMMARY OF THE INVENTION

The present invention has been developed in order to remove the above-described drawbacks inherent to the conventional pictorial communication apparatus.

According to the present invention there is provided a pictorial communication apparatus comprising: an interface circuit for transmitting a first pictorial signal and a first control signal and receiving a second pictorial signal and a second control signal through a network; a detection portion for detecting a call by checking the second control signal from the network, the interface circuit making a connection to the network in response to the detected call; a memory for storing a character code data train forming a personal message; a conversion portion for converting the character code data train into a character video signal; a mode selection switch for selecting between an automatic answering mode and a non-automatic answering mode; and a control portion responsive to the detected call and the mode selection switch for reading the character code data train from the memory, converting the read character code data train into the character video signal by the conversion portion, and transmitting the converted character video signal as the first pictorial signal to the network by the interface circuit in the automatic answering mode.

According to the present invention there is also provided a pictorial communication apparatus comprising: an interface circuit for transmitting a first pictorial signal and a first control signal and receiving a second pictorial signal and a second control signal through a network; a detection portion for detecting a call by checking the second control signal from the network, the interface circuit making a connection to the network in response to the detected call; a memory for storing a character code data train forming a personal message; a mode selection switch for selecting between an automatic answering mode and a non-automatic answering mode; and a control portion responsive to the detected call and the mode selection switch for reading the character code data train from the memory and transmitting the character code data train as the first control signal to the network by the interface circuit in the automatic answering mode.

According to the present invention there is further provided a pictorial communication apparatus comprising: an interface circuit for transmitting first pictorial information and first control information and receiving second pictorial information and second control information through a digital network; a detection portion for detecting a call by checking the second control information from the digital network, the interface circuit making a connection to the digital network in response to the detected call; a memory for storing a character code data train forming a personal message; a conversion portion for converting the character code data train into a character video data; a coding portion for coding the character video data; a mode selection switch for selecting between an automatic answering mode and a non-automatic answering mode; and a control portion responsive to the detected call and the mode selection switch for reading the character code data train from the memory, converting the read character code data train into the character video data by the conversion portion, coding the character video data by the coding portion, and transmitting the coded character video data as the first pictorial information to the digital network by the interface circuit in the automatic answering mode.

According to the present invention there is further provided a pictorial communication apparatus comprising: an interface circuit for transmitting first pictorial information, first control information and receiving second pictorial information and second control information through a digital network; a detection portion for detecting a call by checking the second control signal from the digital network, the interface circuit making a connection to the digital network in response to the detected call; a memory for storing a character code data train forming a personal message; a coding portion for coding the character video signal; a mode selection switch for selecting between an automatic answering mode and a non-automatic answering mode; and a control portion responsive to the detected call and the mode selection switch for reading the character code data train from the memory, and transmitting the character code data train as the first control information to the digital network by the interface circuit in the automatic answering mode. This pictorial communication apparatus may further comprises: a signal producing circuit responsive to the detected call for producing a connection controlling message used for controlling of a communication between the pictorial communication apparatus and another calling pictorial communication apparatus which transmitted the call; and a signal combining portion for combining the connection controlling message and the character code data train from the memory to produce the first control information and for transmitting the first control information to the calling pictorial communication apparatus.

In the above-mentioned pictorial communication apparatus, a key input circuit for producing the character code data train and storing the character code into the memory in response to an operator may be provided.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Figure 1:
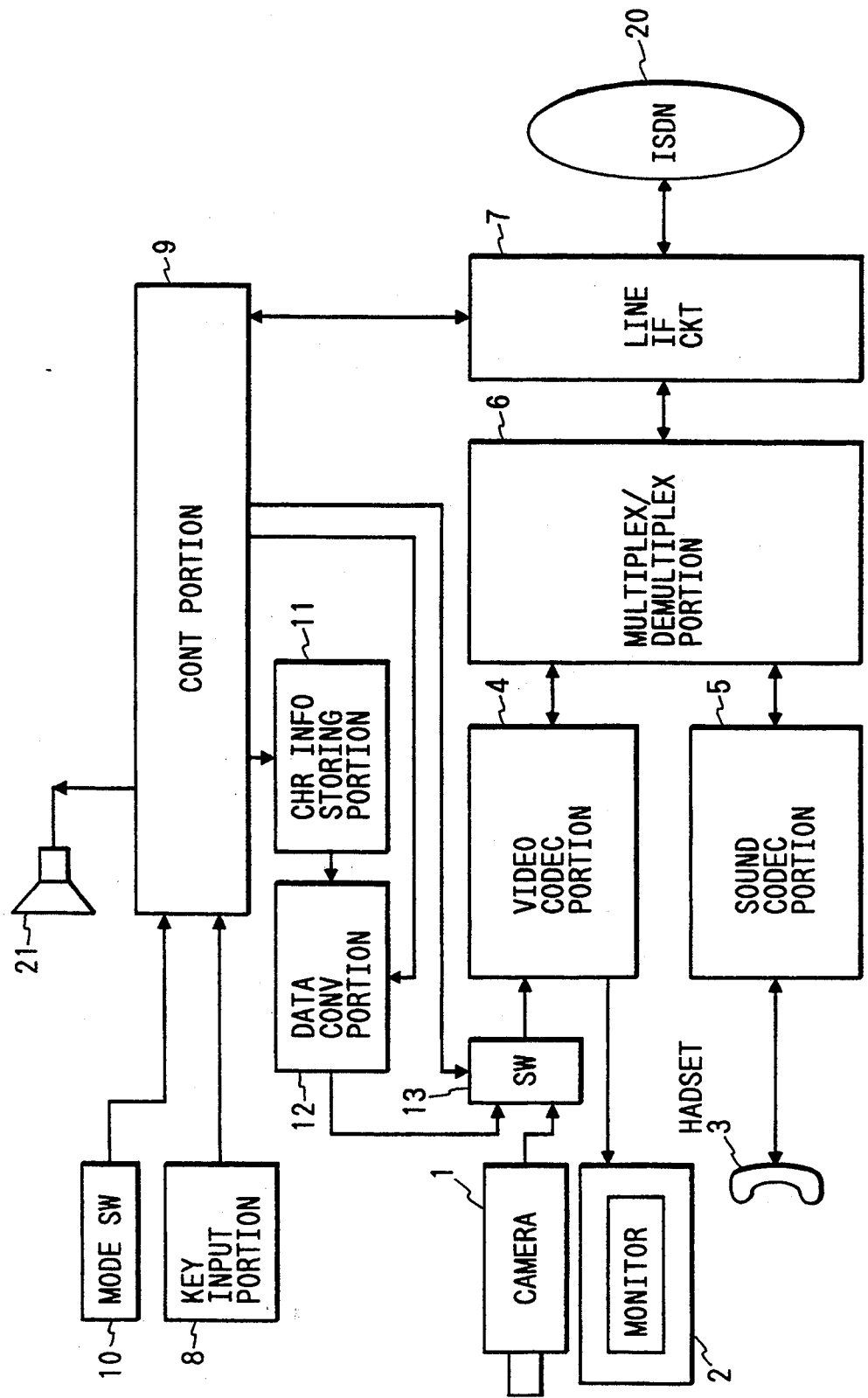
FIG. 1 is a block diagram of a first embodiment showing a pictorial communication apparatus.

Hereinbelow will be described a first embodiment of this invention. FIG. 1 is a block diagram of the first embodiment showing a pictorial communication apparatus.

In FIG. 1, numeral 1 is a camera for taking a picture of a user to produce video data of a moving or still picture. Numeral 2 is a monitor for displaying a moving or still image from a communication party or from the camera 1, numeral 3 is a handset having a microphone for receiving a sound of the user and a speaker for producing a sound for the user. Numeral 4 is a video codec portion for compressing and coding the video data from the camera 1 in a predetermined format and expanding and decoding compressed and coded video data from the ISDN (Integrated Services Digital Network) 20. The monitor 2 displays an image in accordance with the expanded and decoded video data. Numeral 5 is a sound codec portion for compressing and coding a sound signal from the microphone of the handset 3 and expanding and decoding compressed and coded sound data to output a sound by a speaker of the handset 3. Numeral 6 is a multiplex and demultiplex portion for effecting multiplexing to bind the video data and sound data compressed and coded by the video codec portion 4 and the sound coding portion 105 respectively into a multiplexed signal and for separating a multiplexed signal from the ISDN 20 into the video data and the sound data to supply the video data and the sound data to the video coding portion 4 and the sound codec portion 5 respectively. Numeral 7 is a line interface circuit for transmitting and receiving a message information, transmitting and receiving the multiplexed signal, making a connection with the ISDN 110, and disconnecting with the ISDN 110, judging a kind of a message (such as a setup, an answer, and a disconnection message or the like), judging a kind of communication (pictorial communication, packet communication or the like), and sending various messages on the communication line. Numeral 108 is a key input portion having a key board for inputting a telephone number, an out-going message or the like and a hook key actuated by the handset 3. Numeral 9 is a control portion for effecting a total control for whole of the pictorial communication apparatus in response to the inputs from the key input portion 8 and an arrival of a call for controlling of sending of an answer message from the line interface 7 to the ISDN and for controlling of receiving a message from the ISDN 20. The control portion 9 comprises a microprocessor (mpu) executing programs represented by flow charts shown in this embodiment. The control portion 9 controls a calling bell 21 also. Numeral 10 is a mode switch for effecting switching between a normal mode, i.e., a non-automatic answering mode for effecting a normal pictorial communication and an automatic answering mode, numeral 11 is a character information storing portion for coding a character information forming a message inputted from the key input portion 8 to producing a train of character codes and storing the train of character codes. Numeral 12 is a data conversion portion for converting the train of character codes from the character information storing portion 11 into a character video signal. Numeral 13 is a switch for selectively supplying either of the character video signal or the video signal from the camera 1 to the video codec portion 4. ISDN 20 is of 2B+D type having two communication channels i.e., B channels, for communication of video data and sound information and a control channel, i.e., D channel, for transmitting control information such as call controlling messages or the like.

Figure 2:
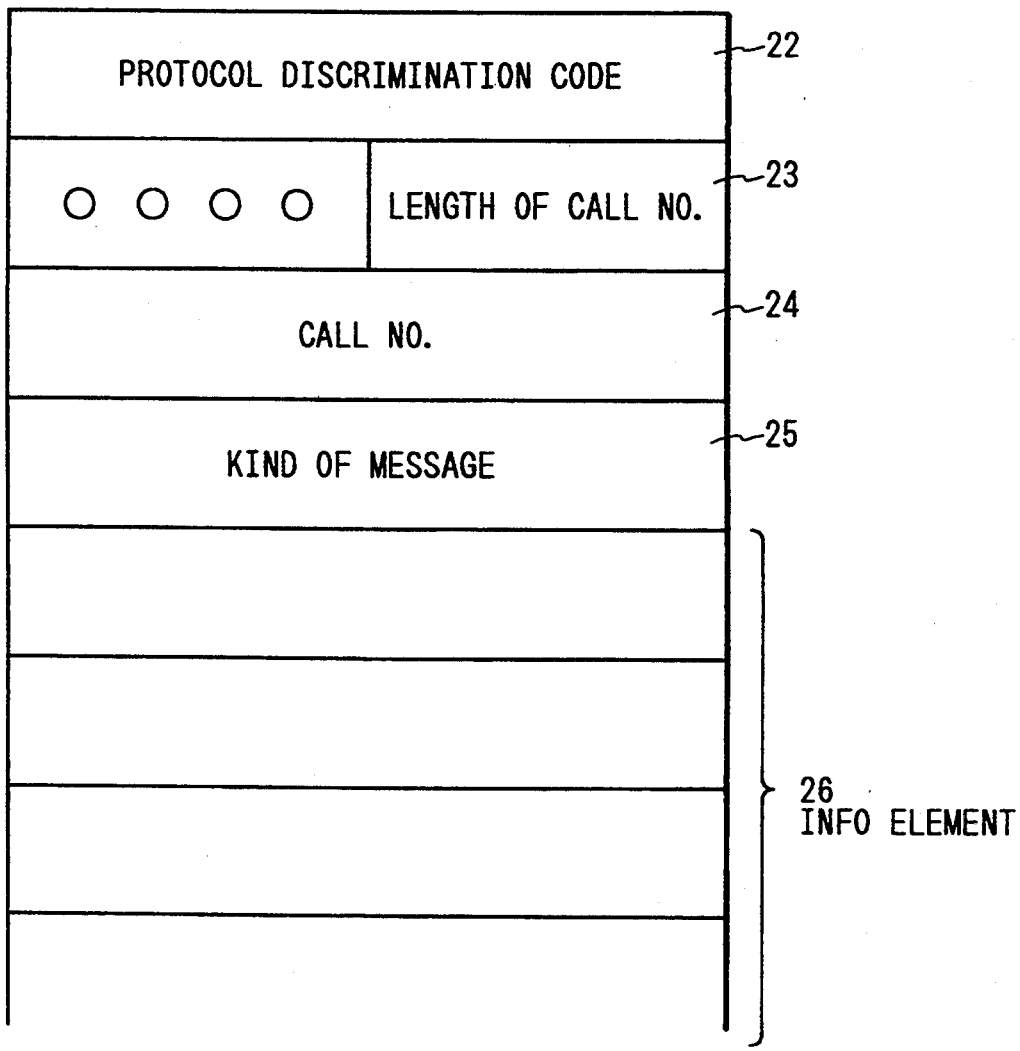
FIG. 2 shows an illustration of a prior art format of the call controlling message used in the ISDN system.

The call controlling messages relating the communication between the ISDN 20 and the line interface circuit 7 are for the controlling of communication between the pictorial communication apparatus and ISDN 20 or a called or calling partner and are transmitted through the D channel. FIG. 2 shows an illustration of a prior art format of the call controlling message used in the ISDN system. The format includes a protocol discrimination code 22 for discriminating the message between the call controlling messages and information of other network layer such as a packet used under CCITT recommendation, a length of call number 23 indicative of a length of the following data in octet, a call number 25 indicating which message corresponds to the call, a kind of a message 25 indicative of a kind of the call controlling messages, and a plurality of further information elements 26 indicative of further information of processings.

The call controlling messages includes a setup message, an alert message, an answer message, an answer acknowledge message, a disconnection message, a release message, a release completion message or the like. The control portion 9 generates these messages.

The setup message is a message sent from a sending side to the network or from the network to the receiving side when communication is required. The further information elements 26 of the setup message include a telephone number of a called party, a telephone number of a calling party, a kind of a transmission signal (such as signals for pictorial communication or telephone communication or the like).

The alert message is a message transmitted to the sending side when a setup message reaches a receiving side and the receiving side cannot respond the setup message at once.

The answer message is a message for informing the network or the sending side of reception of a call.

The answer acknowledge message is a message indicating which terminal is to be connected when a setup message is sent to a plurality of terminals and answer messages are sent from the plurality of terminals.

The disconnection message is a message for requesting a disconnection sent to the line and can be transmitted from either of the sending or the receiving side.

The release message is a message indicating that the request of the disconnection is accepted and thus, the B channel as a communication channel has been released.

The release completion message is a message indicating that the release message is accepted and thus, the side sending the disconnection message also releases the B channel.

Operation of the pictorial communication apparatus will be described.

Figure 3:
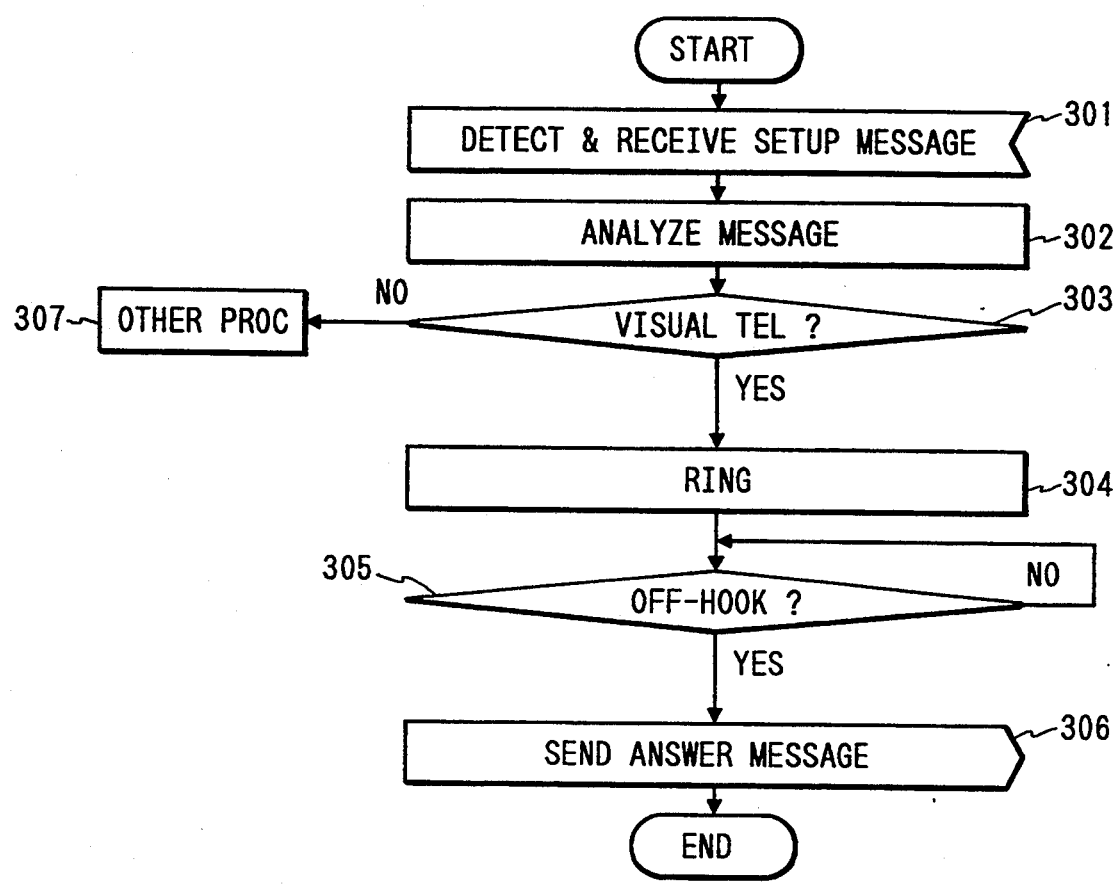
FIG. 3 shows a flow chart of the first embodiment showing a normal operation mode of the pictorial communication apparatus.

FIG. 3 shows a flow chart of the first embodiment showing a normal operation mode of the pictorial communication apparatus. The control portion 9 executes a program represented by this flow chart.

The line interface circuit 7 detects a call by receiving of the setup message from the ISDN 20 and informs the control portion 9 of the arrival of the call in step 301 and sends the setup message to the control portion 9. The control portion 9 detects the arrival of the call, that is, it receives the setup message in step 301. The control portion 9 analyzes the setup message in step 302 and judges whether or not the kind of a signal to be transmitted included in the setup message is of the pictorial communication in step 303. If the answer is NO, other processings are executed in step 307. If the answer is YES, that is, in response to the arrival of the call, the control portion 9 operates the bell 21 to produce a call sound in step 304. Then, when the hook key becomes in the off-hook condition, the control portion 9 detects the off-hook condition in step 305 and operates the line interface circuit 7 to send an answer message. In response to the control portion 9, the line interface circuit 7 sends the answer message through the ISDN 20 in step 306. A line interface circuit 7 of a pictorial communication apparatus on the calling side receives the answer message from the ISDN 20 and analyzes the answer message and confirms a permission of the communication from the called party included in the answer message from the called side. This terminates the connection between the calling party and called party.

After completion of the connection, communication starts.

Sending operation will be described.

A video signal from the camera 1 and a sound signal from the microphone of the handset 3 are compressed and coded by the video codec portion 4 and the sound codec portion 5 respectively. Here, the video signal and the sound signal are outputted in digital signal forms. However, if the processing circuits of the pictorial communication apparatus are of digital type and the video signal and sound signal are of analog types, A/D converters should be provided. If the processing circuits of the pictorial communication apparatus are of analog type, no A/D converter is required. The sound signal and the video signal compressed and coded are multiplexed by the multiplexing and demultiplexing portion 6 to supply a multiplexed signal to the line interface circuit 7. The line interface circuit 7 sends the multiplexed signal to the ISDN 20.

Figure 4:
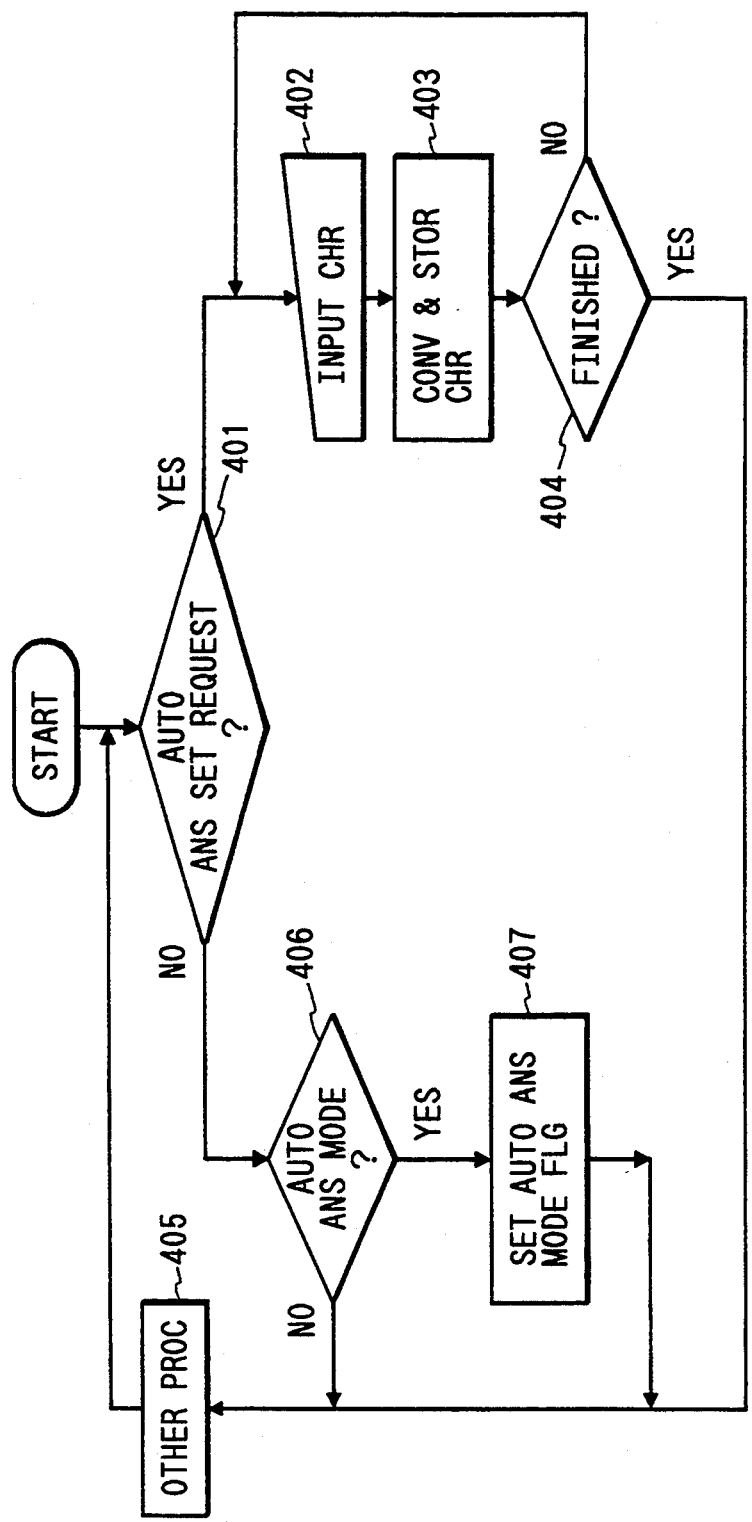
FIG. 4 shows a flow chart of the first embodiment showing a setting operation for the automatic answering operation.

A setting operation for the automatic answering will be described. FIG. 4 shows a flow chart of the first embodiment showing a setting operation for the automatic answering.

The control portion 9 detects whether or not an automatic answering setting request signal via the key input portion 8 is present in step 401. If YES, processing proceeds to step 402. In step 402, the control portion receives a character inputted by a user using the key input portion 8. The control portion 9 converts the character into a character code and stores the character code in the character information storing portion 11. In the step 404, if the input of characters is not finished, processing returns to step 402. If the input of characters is finished in step 402 a character train is stored as character codes and then, processing proceeds to step 405. In step 405, the control portion 9 executes other processings.

In step 401, the answer is NO, processing proceeds to step 406. In step 406, a decision is made as to whether or not the mode switch 10 is in the automatic answering mode. If the mode switch 10 is in the automatic answering mode, the control portion 9 sets an automatic answering flag in step 407 and processing proceeds to step 405. After processing of step 405, processing returns to step 401.

Figure 5:
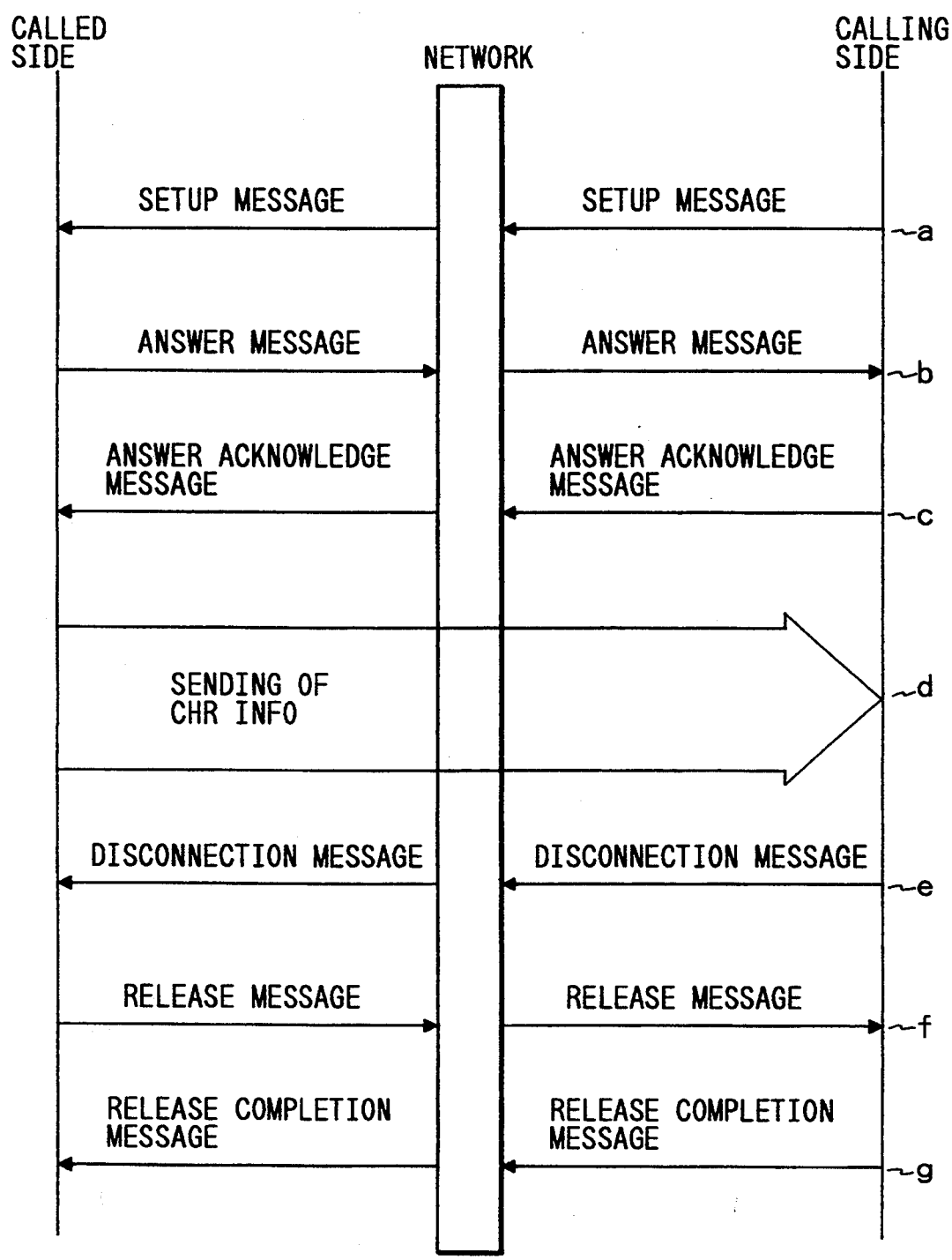
FIG. 5 shows a sequence chart of the first embodiment showing a receiving operation in the automatic answering mode.
Figure 6:
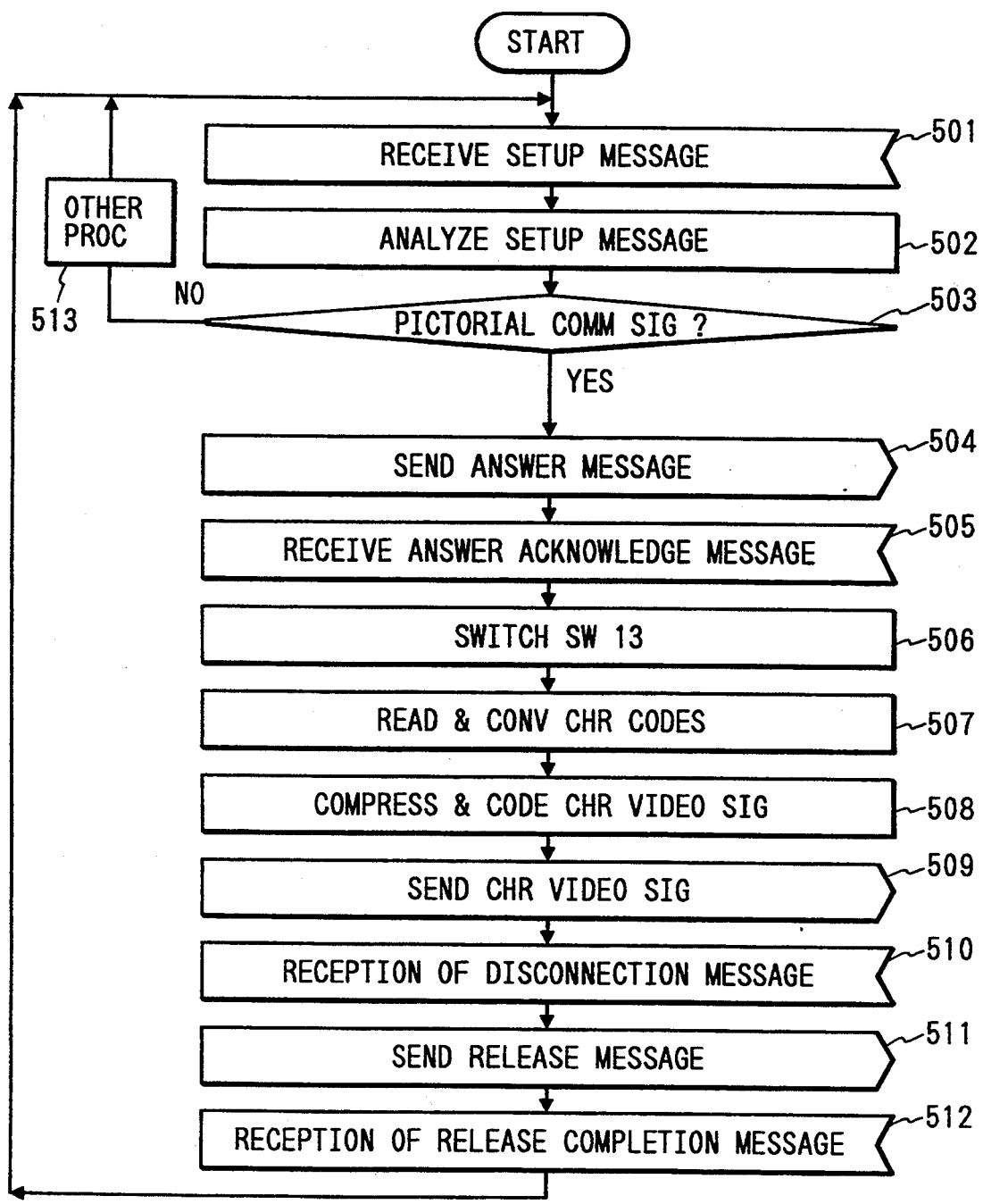
FIG. 6 shows a flow chart of the first embodiment showing a receiving operation in the automatic answering mode.

FIG. 5 shows a sequence chart of the first embodiment showing a receiving operation in the automatic answering mode. FIG. 6 shows a flow chart of the first embodiment showing a receiving operation in the automatic answering mode.

The processing shown in FIG. 6 is executed in the automatic answering mode. In step 501, the control portion 9 of the called side detects and receives a setup message from ISDN 20 via the line interface circuit 7 (sequence a). The control portion 9 analyzes the setup message in step 502. In the following step 503, the control portion 9 detects whether or not a signal which will be sent is a signal for the pictorial communication. If YES, the control portion 9 sends an answer message to the sending side through the ISDN 20 via the line interface circuit 7 in step 504 to inform the sending side that the pictorial communication of the receiving side is ready for communication (sequence b). The control portion 9 receives an answer acknowledge message sent from the pictorial communication apparatus of the sending side in step 505 (sequence c). This completes the connection between the pictorial communication apparatus of the sending and receiving sides.

After completion of connection, the control portion 9 operates the switch 13 to input an output of the data conversion portion 12 into the video codec portion 4 in step 506. Then, the control portion 9 operates the data conversion portion 12 to read a train of character codes and convert the character codes into a character video signal and to supply the character video signal to the video codec portion 4 via the switch 13 in step 507. The character video signal is compressed and coded according to a predetermined coding method in the video codec portion 4 in step 508. The control portion 9 operates the multiplexing and demultiplexing portion 6 and the line interface circuit 7 to send the character video signal to the ISDN 20 in step 509. This provides a message from the called party to the pictorial communication of the calling party by reproducing the sent character video signal (sequence d).

Then, when the control portion 9 receives a disconnection message for requesting disconnection from sending side through ISDN 20 via the line interface circuit 7 in step 510 (sequence e), the control portion 9 sends a release message informing the pictorial communication of the sending side of releasing of the B channel via the line interface circuit 7 (sequence f). The control portion 9 stops the operation of the data conversion portion 12 and switches the switch 13 to supply the video signal from the camera 1 to the video codec portion 4. The pictorial communication apparatus of the sending side sends a release completion message indicative of releasing of B channel to the pictorial communication apparatus of the receiving side in response to the releasing message. Then, the control portion 9 of the pictorial communication apparatus of the receiving side receives the release completion message, the receiving operation finishes and processing returns to step 501 (sequence g).

As mentioned above, in this embodiment, because the message for the automatic answering operation is stored in a character code form, a storing capacity for the message for the automatic answering operation can be reduced. Moreover, the character code is sent to the sending side after the conversion of the character code to the character video signal, so that the pictorial communication apparatus of the sending side is not required to have a data conversion portion 12 for converting the character code to the character video signal.

Figure 7:
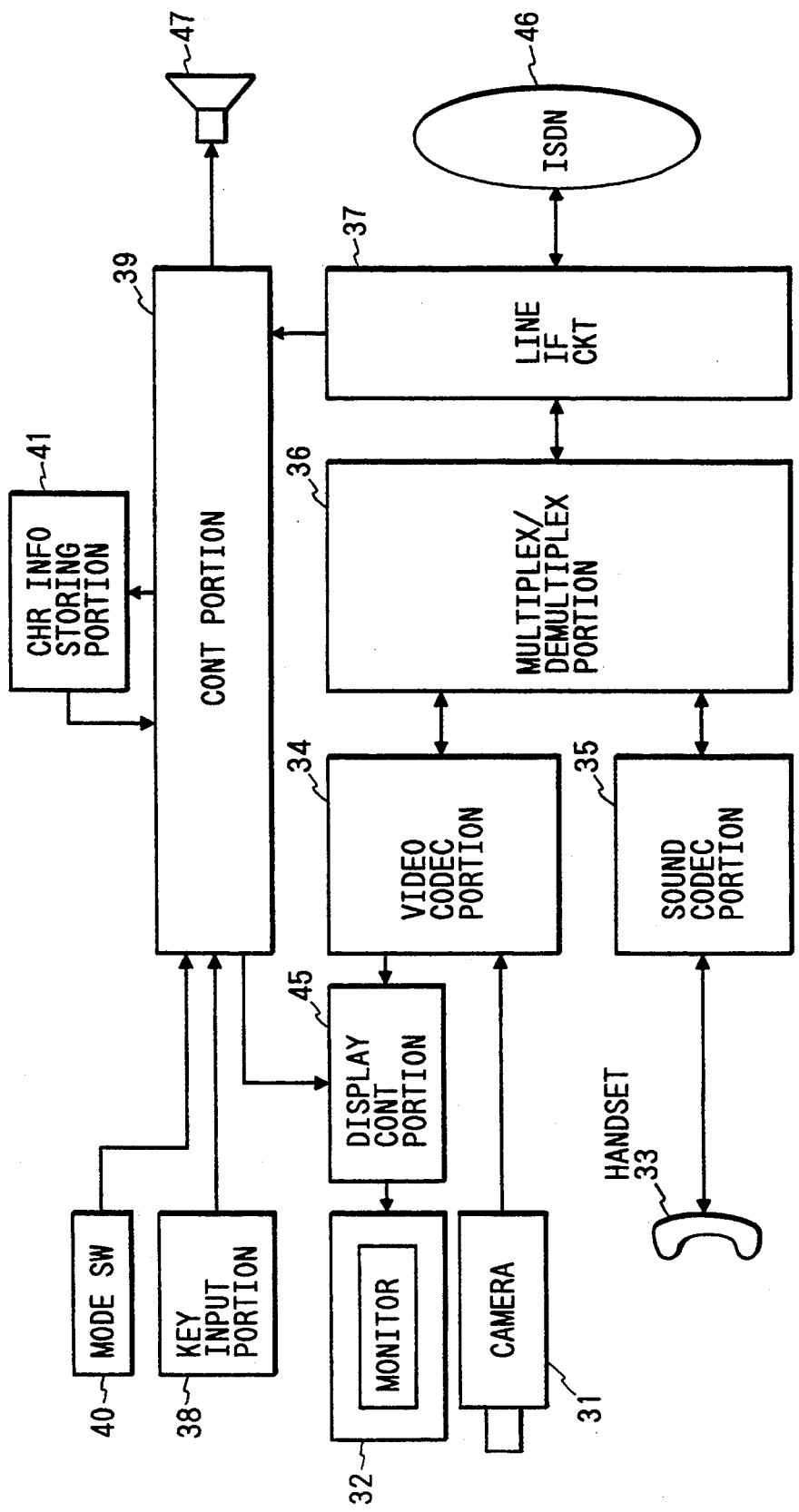
FIG. 7 is a block of a second embodiment showing a pictorial communication apparatus.

FIG. 7 is a block of a second embodiment showing a pictorial communication apparatus.

Figure 8:
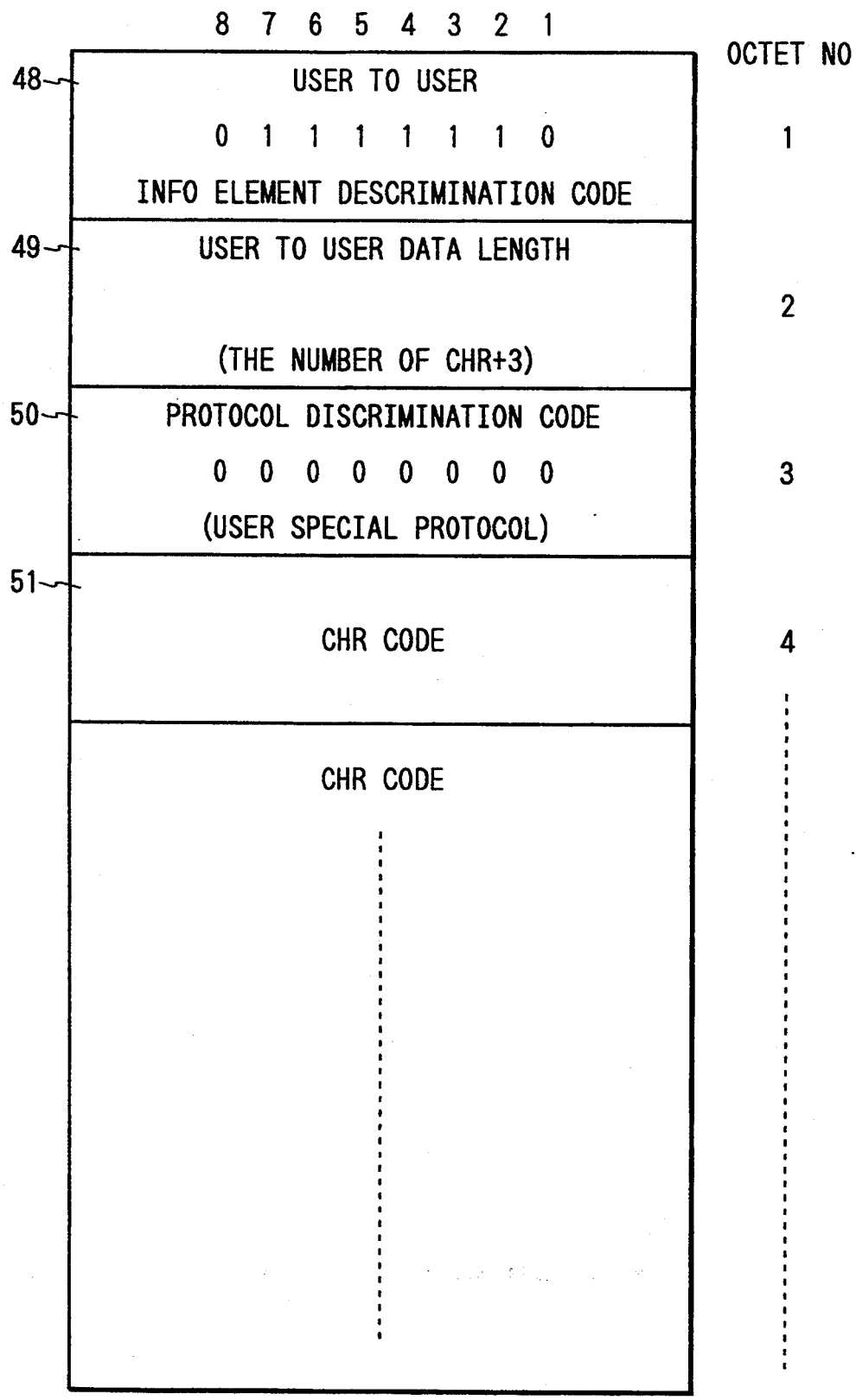
FIG. 8 is an illustration of the second embodiment showing a portion of a format of the disconnection message.

In FIG. 7, numeral 31 is a camera for taking a picture of a user to produce video data. Numeral 32 is a monitor for displaying a moving or still image from a communication party or from the camera 31, numeral 33 is a handset having a microphone for receiving a sound of the user and a speaker for producing a sound for the user. Numeral 34 is a video codec portion for compressing and coding the video data from the camera 31 in a predetermined format and expanding and decoding compressed and coded video data. The monitor 32 displays an image in accordance with the expanded and decoded video data. Numeral 35 is a sound codec portion for compressing and coding a sound signal from the microphone of the handset 33 and expanding and decoding compressed and coded sound data to output a sound from a speaker of the handset 33. Numeral 36 is a multiplex and demultiplex portion for effecting multiplexing to bind the video data and sound data compressed and coded by the video codec portion 34 and the sound coding portion 35 respectively into a multiplexed signal and for separating a multiplexed signal into the video data and the sound data to supply the video data and the sound data to the video coding portion 34 and the sound codec portion 35 respectively. Numeral 37 is a line interface circuit for the controlling of communication between the pictorial communication apparatus and ISDN 20 or a called or calling partner, that is, it is for transmitting and receiving the controlling messages through D channel and transmitting and receiving the multiplexed signal including video information and sound information in accordance with the controlling message or operation of the key input portion 68. Numeral 38 is a key input portion having a key board and hook key or the like. Numeral 39 is a control portion for effecting a total control for whole of the pictorial communication apparatus in response to the inputs from the key input portion 38 and an arrival of a call for controlling of sending of an answer message from the line interface 7 to the ISDN and for controlling of receiving a message from the ISDN 20. The control portion 39 comprises a microprocessor (mpu) executing programs represented by flow charts shown in this embodiment. The control portion 39 controls a calling bell 47 also. Numeral 40 is a mode switch for effecting switching between the normal mode for effecting a normal pictorial communication and an automatic answering mode, numeral 41 is a character information storing portion for coding a character information forming a message inputted from the key input portion 38 to produce a train of character codes and storing the train of character codes. Numeral 43 is a character information transmission control portion for transmitting character codes stored in the character information storing portion 41 via the line interface circuit 37 such that the character codes read for the character information storing portion 41 is included in a disconnection message as user to user information to have a predetermined format. FIG. 8 is an illustration of the second embodiment showing a portion of a format of the disconnection message. The user to user information includes a user to user information element discrimination code 48, a user to user data length indicative of a length of data in octet transmitted to the receiving side, a protocol discrimination code 50, and sending character codes 51.

The control portion 39 extracts the coded character information from the user to user information in the disconnection message received through the line interface circuit 37. Numeral 45 is a display control portion for controlling of displaying of the coded character information from the control portion 39 on the monitor 32.

Here, the communication control messages are the same as those of the first embodiment and thus, a detailed description is omitted.

Operation of the second embodiment of the pictorial communication apparatus will be described.

Figure 9:
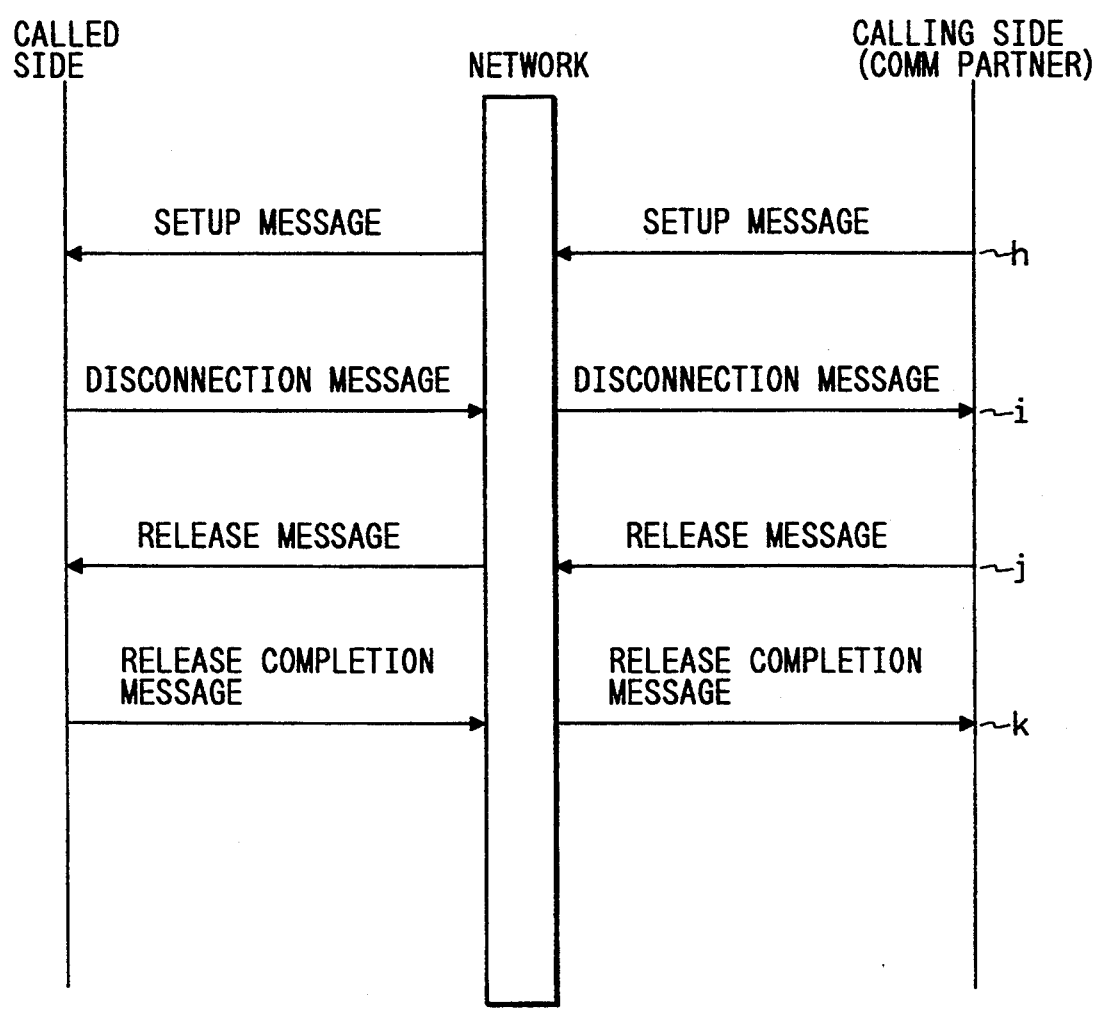
FIG. 9 shows a sequence chart of the second embodiment showing an automatic answering operation.

FIG. 9 shows a sequence chart of the second embodiment showing an automatic answering operation.

Figure 10:
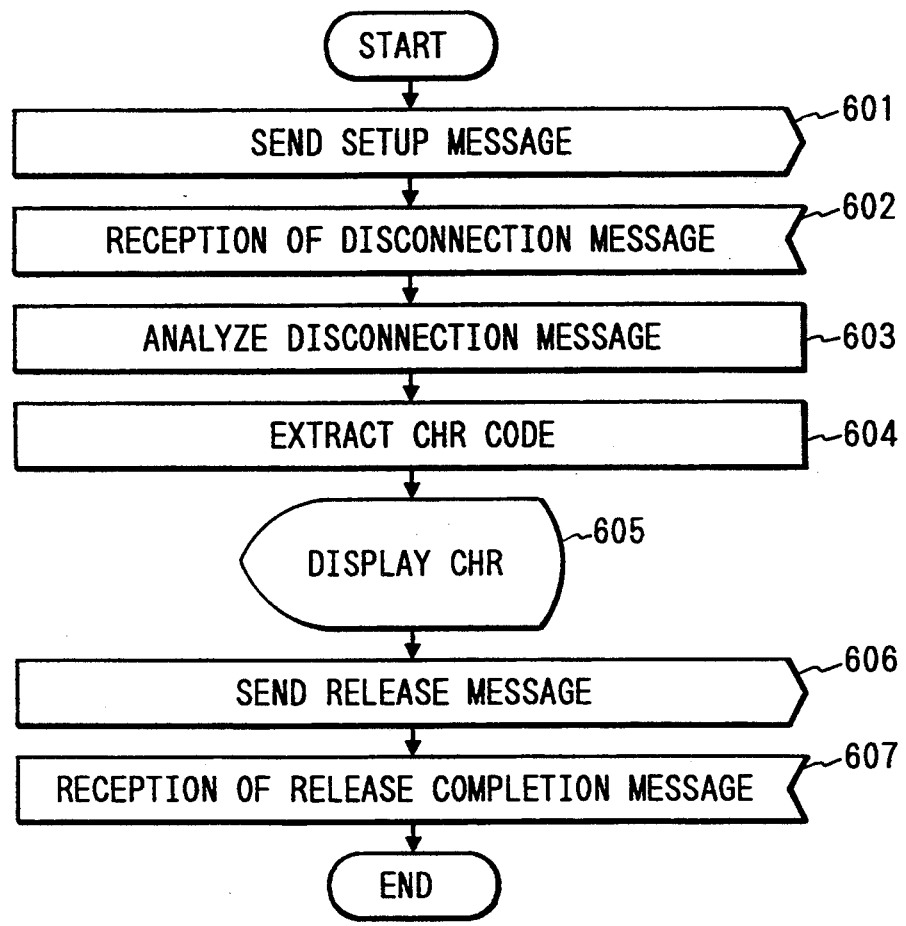
FIG. 10 shows a flow chart of the second embodiment showing an operation mode of the pictorial communication apparatus of the calling side.

FIG. 10 shows a flow chart of the second embodiment showing an operation mode of the pictorial communication apparatus of the calling side.

Figure 11:
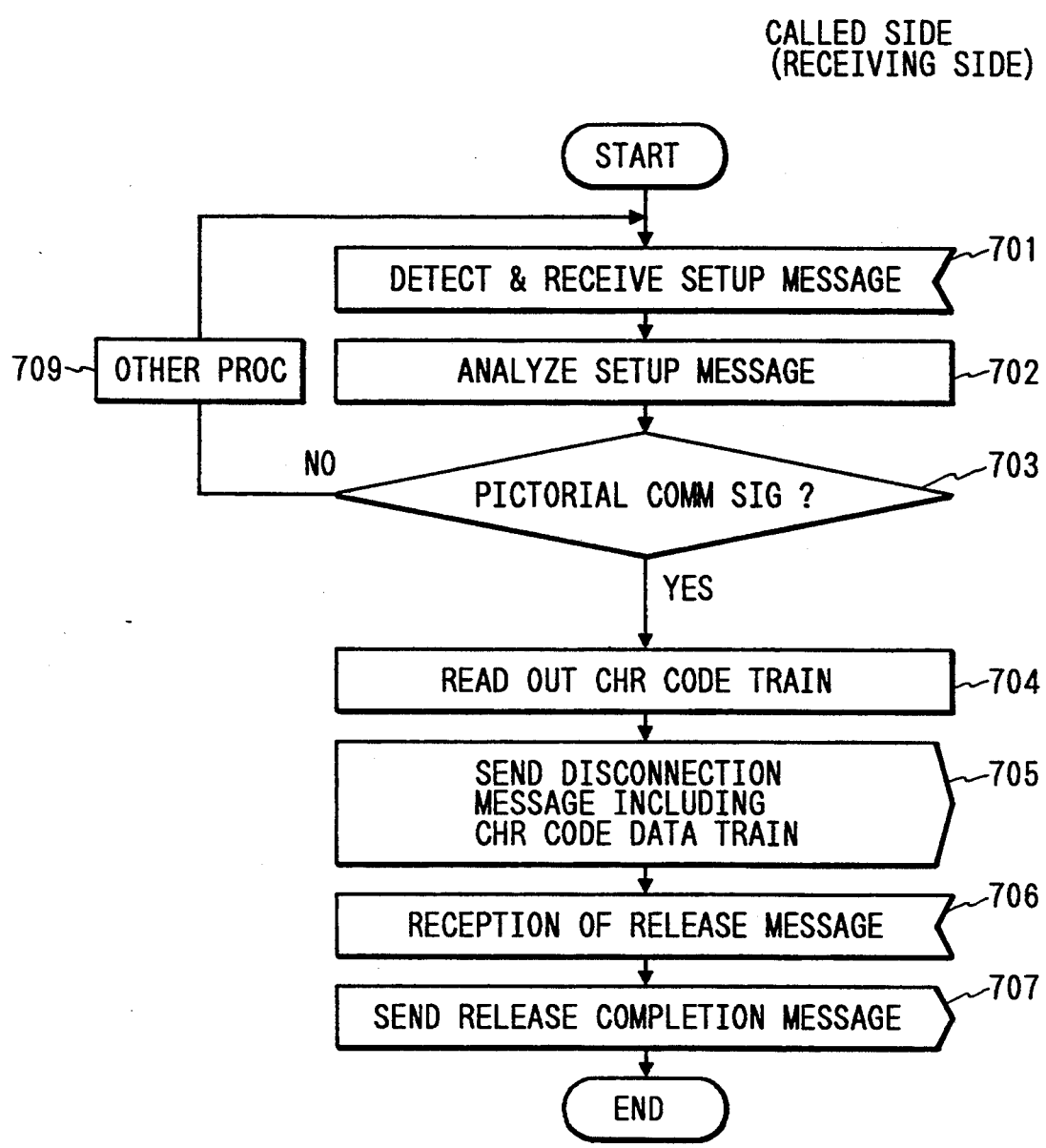
FIG. 11 shows a flow chart of the second embodiment showing an operation mode of the pictorial communication apparatus of the receiving side.

FIG. 11 shows a flow chart of the second embodiment showing an operation mode of the pictorial communication apparatus of the receiving side. An operation in the normal mode and the character setting operation for automatic answering mode are the same as those of the first embodiment. Therefore, a detailed description of these operations are omitted.

At first, a pictorial communication apparatus of the calling side transmits a setup message to a desired pictorial communication apparatus in step 601. The pictorial communication apparatus of the called (receiving) side detects and receives the setup message through the line interface circuit 37 in step 701 (sequence h). Here, it is assumed that both pictorial communication apparatus of the calling and called parties have the same structure as shown in FIG. 7 for convenience of explanation. In the following step 702, the control portion 39 analyzes the setup message in step 702. Then, in step 703, the control portion 39 makes a decision as to whether or not the signal which will be transmitted is a pictorial communication signal. If YES, the control portion 39 reads out a character code data train previously registered from the character information storing portion 41 in step 704. In the following step 705, the control portion 39 adds the character code data train 51 to a disconnection message as shown in FIG. 8 and sends the disconnection message via the line interface circuit 37 to the pictorial communication apparatus of the calling side in step 705 (sequence i). In step 703, if the signal which will be transmitted is not a pictorial communication signal, for example, the call is of the conventional telephone call without pictorial communication, the control portion 39 executes other processing to perform the conventional automatic answering response in step 709 and finishes the processing of called side.

On the other hand, the pictorial communication apparatus of the sending side receives the disconnection message via line interface circuit 97 in step 602. Then, the control portion 39 analyzes the disconnection message in step 603. The control portion extracts the character code data train from the disconnection message and supplies the extracted character code data train to the display control portion 45 in step 604. The display control portion 45 generates a character video signal from the character code data train from the control portion 39 and supplies the character video signal in place of the video signal from the video codec portion 34 to the monitor 32 in step 605. The monitor 34 displays the character train sent from the pictorial communication apparatus through the disconnection message.

Then, the control portion 39 of the receiving side controls the line interface 37 to release the B channel and sends a release message for releasing the B channel to the pictorial communication apparatus of the receiving side through the D channel. In the receiving side, when the control portion 39 receives the release message via the line interface circuit 37, the control portion 39 controls the line interface circuit 37 to release the B channel and sends a release acknowledge message to the pictorial communication apparatus of the sending side through the D channel in step 707. This communication finishes by reception of the release acknowledge message by the pictorial communication apparatus of the calling side via the line interface circuit 37 through the D channel.

In this embodiment, the pictorial communication of the called side transmits the automatic answering message in the state of the character code data train. On the other hand, the pictorial communication apparatus of the calling side analyzes the character code data train and displays the automatic answering message on the monitor 32. Therefore, an amount of data and a transmission interval for sending the message is smaller and shorter than the case that the message is transmitted through the video signal as described in the first embodiment.

Moreover, the pictorial communication apparatus of the called side sends the disconnection message to immediately disconnect the line in response to the reception of the setup message, so that the communication interval is saved and disconnection operation in the sending side is automatically performed.

Figure 12:
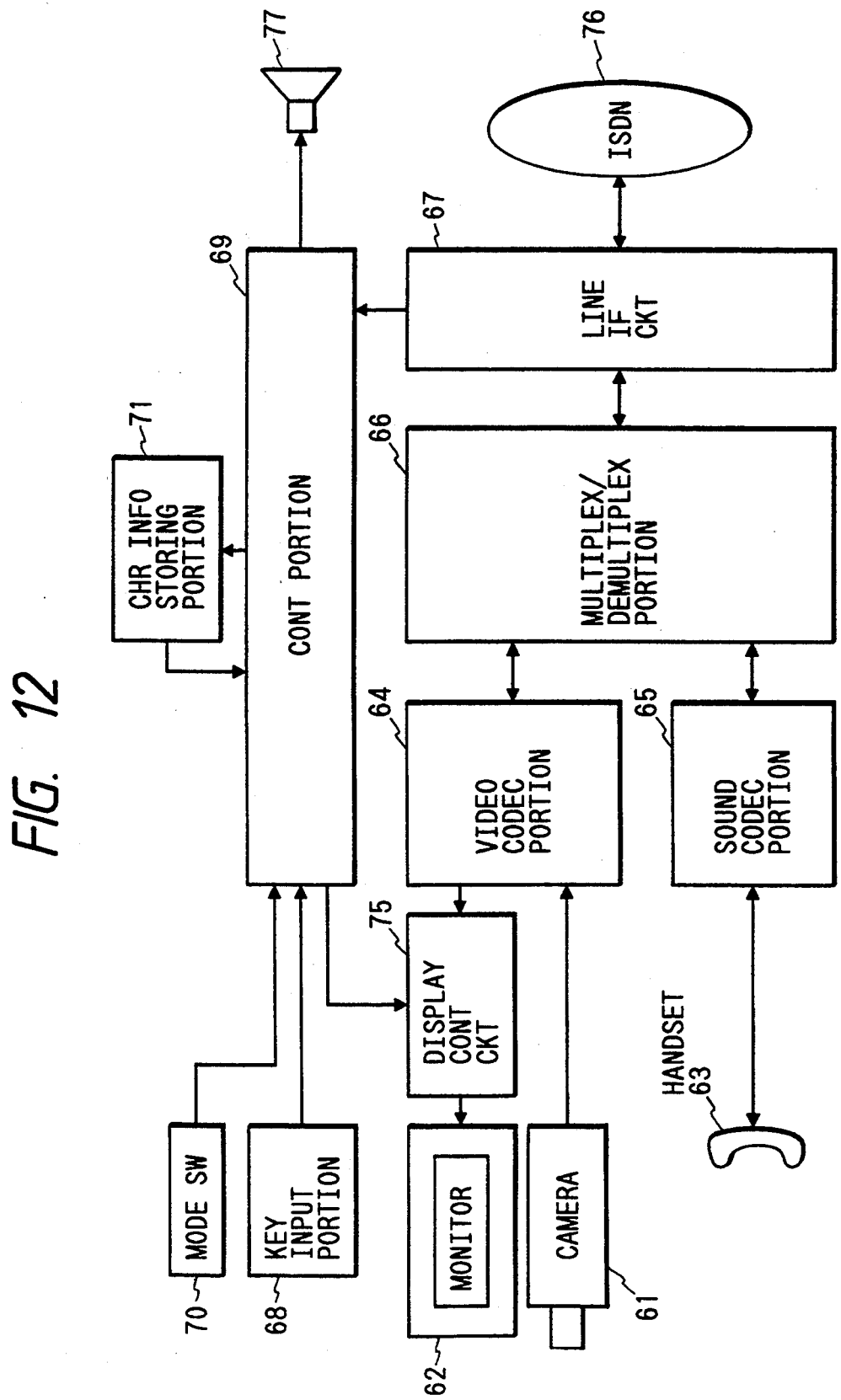
FIG. 12 is a block of a third embodiment showing a pictorial communication apparatus.

FIG. 12 is a block of a third embodiment showing a pictorial communication apparatus.

In FIG. 12, numeral 61 is a camera for taking a picture of a user to produce video data. Numeral 62 is a monitor for displaying a moving or still image from a communication party or from the camera 61, numeral 63 is a handset having a microphone for receiving a sound of the user and a speaker for producing a sound for the user. Numeral 64 is a video codec portion for compressing and coding the video data from the camera 61 in a predetermined format and expanding and decoding compressed and coded video data. The monitor 62 displays an image in accordance with the expanded and decoded video data. Numeral 65 is a sound codec portion for compressing and coding a sound signal from the microphone of the handset 63 and expanding and decoding compressed and coded sound data to output a sound from a speaker of the handset 63. Numeral 66 is a multiplex and demultiplex portion for effecting multiplexing to bind the video data and sound data compressed and coded by the video codec portion 64 and the sound coding portion 65 respectively into a multiplexed signal and for separating a multiplexed signal into the video data and the sound data to supply the video data and the sound data to the video coding portion 64 and the sound codec portion 65 respectively.

Figure 13:
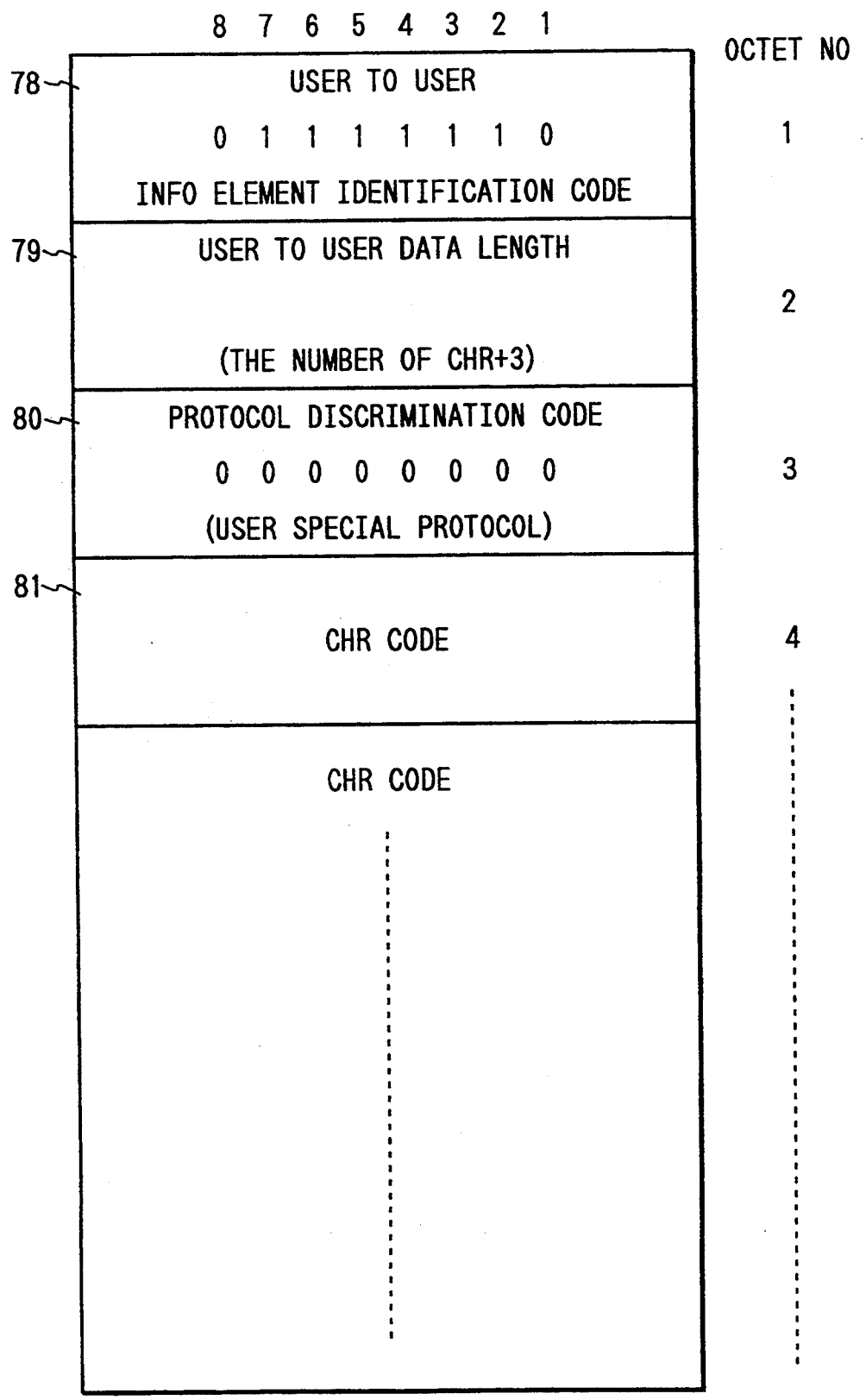
FIG. 13 is an illustration of the third embodiment showing a portion of a format of the alert message.

Numeral 67 is a line interface circuit for the controlling of communication between the pictorial communication apparatus and ISDN 20 or a called or calling partner, that is, it is for transmitting and receiving the controlling messages through D channel and transmitting and receiving the multiplexed signal including video information and sound information in accordance with the controlling message or operation of the key input portion 68. The key input portion 68 has a key board and hook key or the like. Numeral 69 is a control portion for effecting a total control for whole of the pictorial communication apparatus in response to the inputs from the key input portion 68 and an arrival of a call for controlling of sending of an answer message from the line interface 67 to the ISDN and for controlling of receiving a message from the ISDN 76. The control portion 69 comprises a microprocessor (mpu) executing programs represented by flow charts shown in this embodiment. The control portion 69 controls a calling bell 77 also. Numeral 70 is a mode switch for effecting switching between a normal mode for effecting a normal pictorial communication and an automatic answering mode, numeral 71 is a character information storing portion for coding character information forming a message inputted from the key input portion 38 to producing a train of character codes and storing the train of character codes. Numeral 75 is a display controlling circuit for converting a character code data train extracted by the control portion 69 into a character video signal and supplying the character video signal to the monitor in place of the output of the video codec portion 64. In the normal condition, the display control circuit 75 supplies the output of the video codec portion to the monitor 62. However, when the control portion 69 detects the character code data train 81 in the communication message, the control portion controls the display control portion 75 to display the extracted character code data train 81. The control portion 69 extracts character code data train and supplies the character code data train to the display control circuit 75. FIG. 13 is an illustration of the third embodiment showing a portion of a format of the alert message. The user to user information includes a user to user information element discrimination code 78, a user to user data length 79 indicative of a length of data in octet transmitted to the receiving side, a protocol discrimination code 80, and a character code data train 81.

The control portion 69 extracts coded character code data data train 81 from the user to user information in the alert message received through the line interface circuit 67. Then, the control portion 69 controls displaying of the coded character information from the character information extracted from the disconnection message on the monitor 62 using the display control circuit 75.

Here, the communication control messages are the same as those of the first embodiment and thus, a detailed description is omitted.

Operation of the third embodiment of the pictorial communication apparatus will be described.

Figure 14:
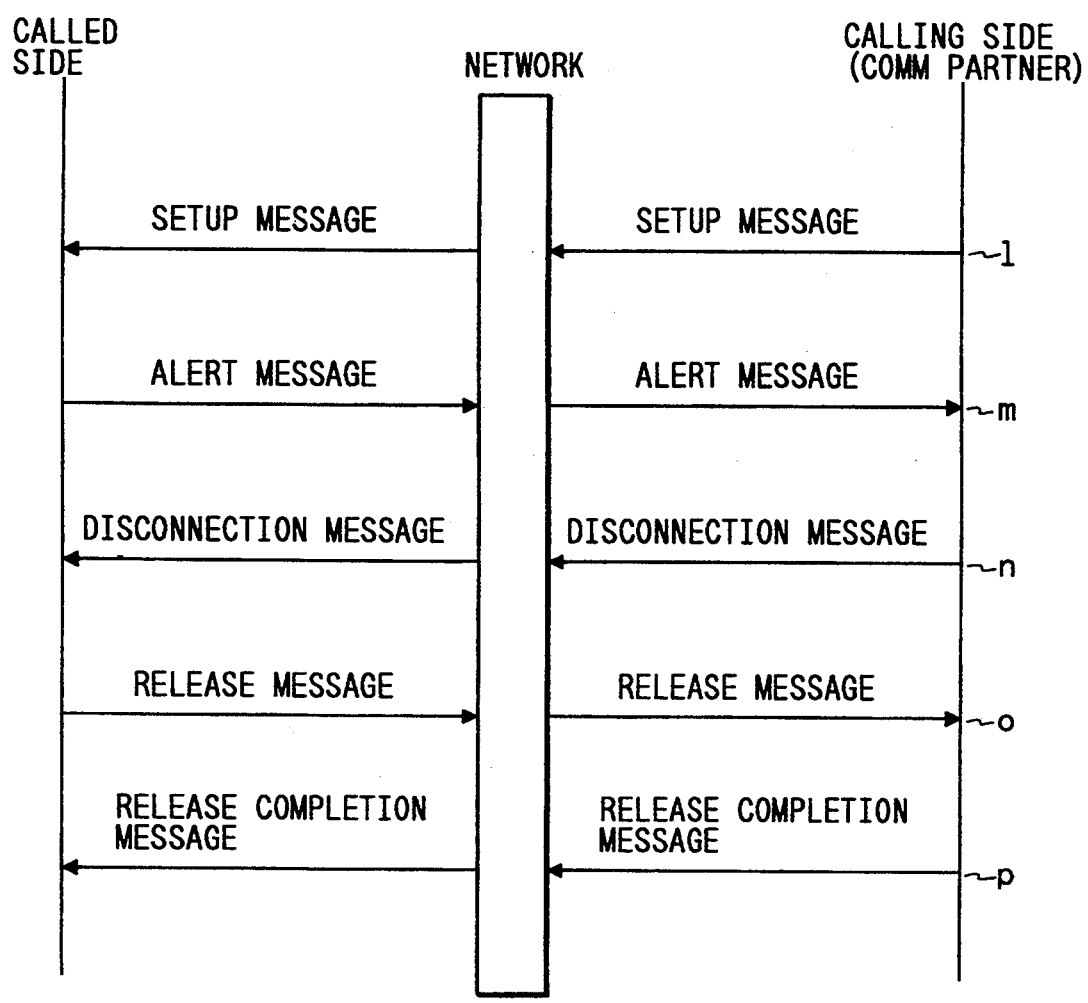
FIG. 14 shows a sequence chart of the third embodiment showing an automatic answering operation.

FIG. 14 shows a sequence chart of the third embodiment showing an automatic answering operation.

Figure 15:
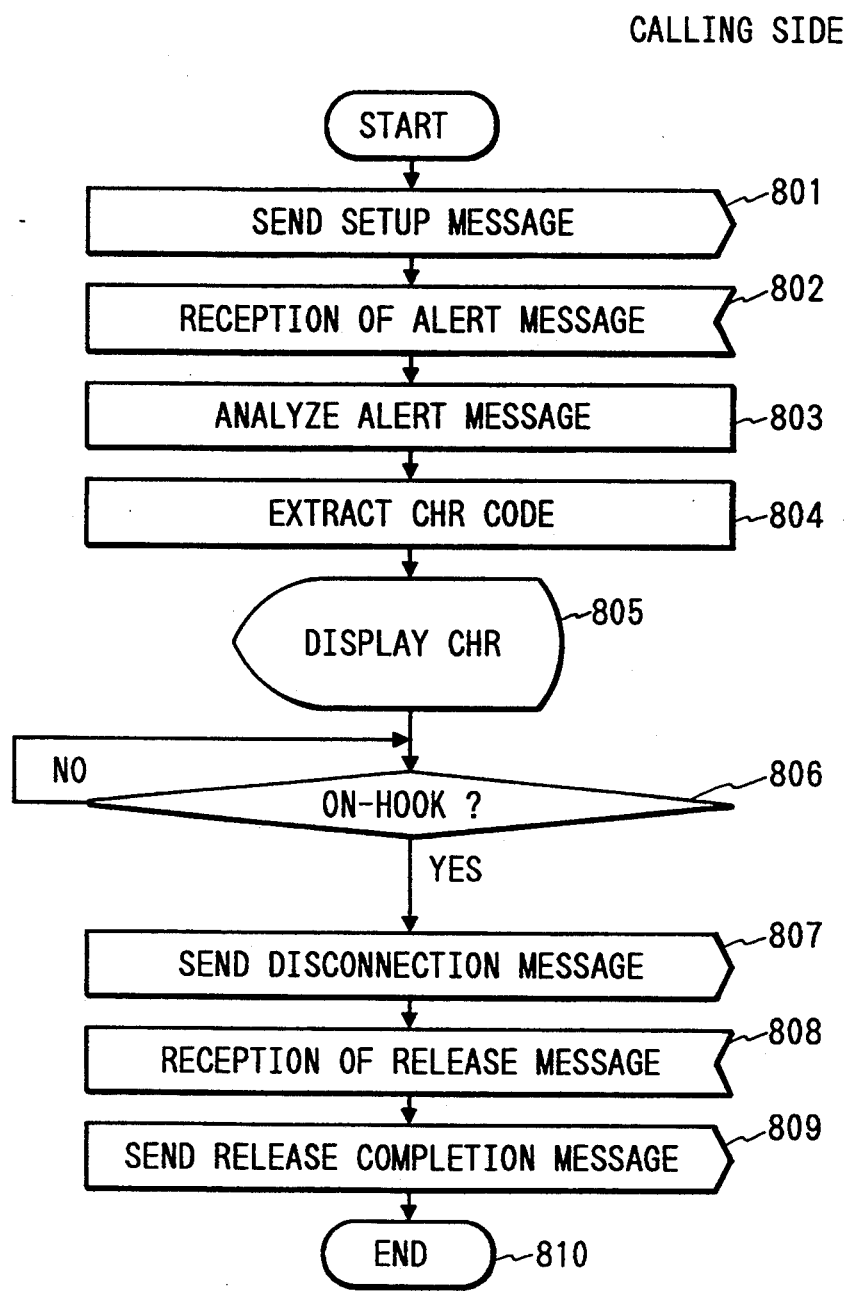
FIG. 15 shows a flow chart of the third embodiment showing an operation mode of the pictorial communication apparatus of the calling side in normal operation mode.

FIG. 15 shows a flow chart of the third embodiment showing an operation mode of the pictorial communication apparatus of the calling side in normal operation mode.

Figure 16:
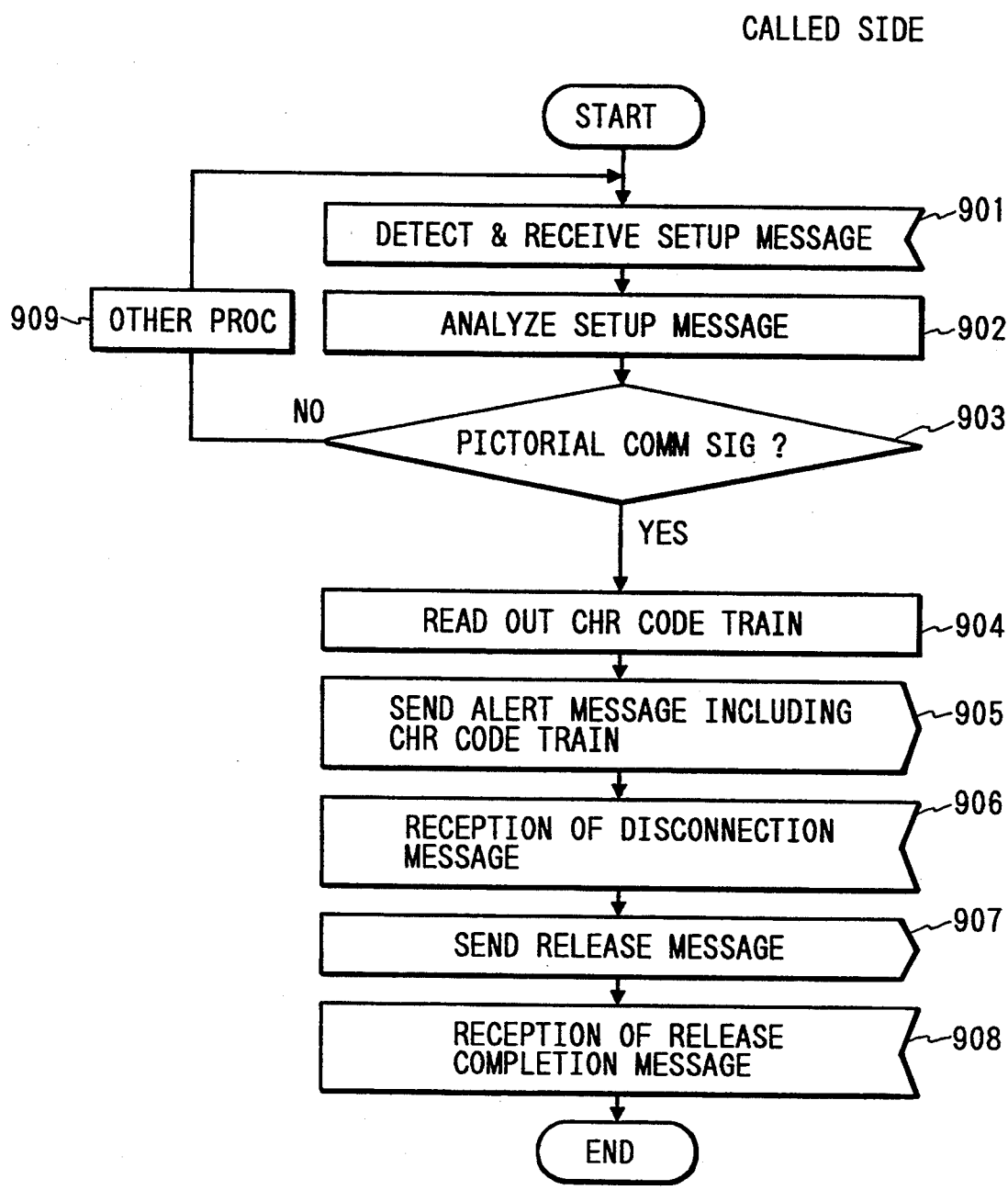
FIG. 16 shows a flow chart of the third embodiment showing an operation mode of the pictorial communication apparatus of the called side in the automatic answering mode.
Figure 17:
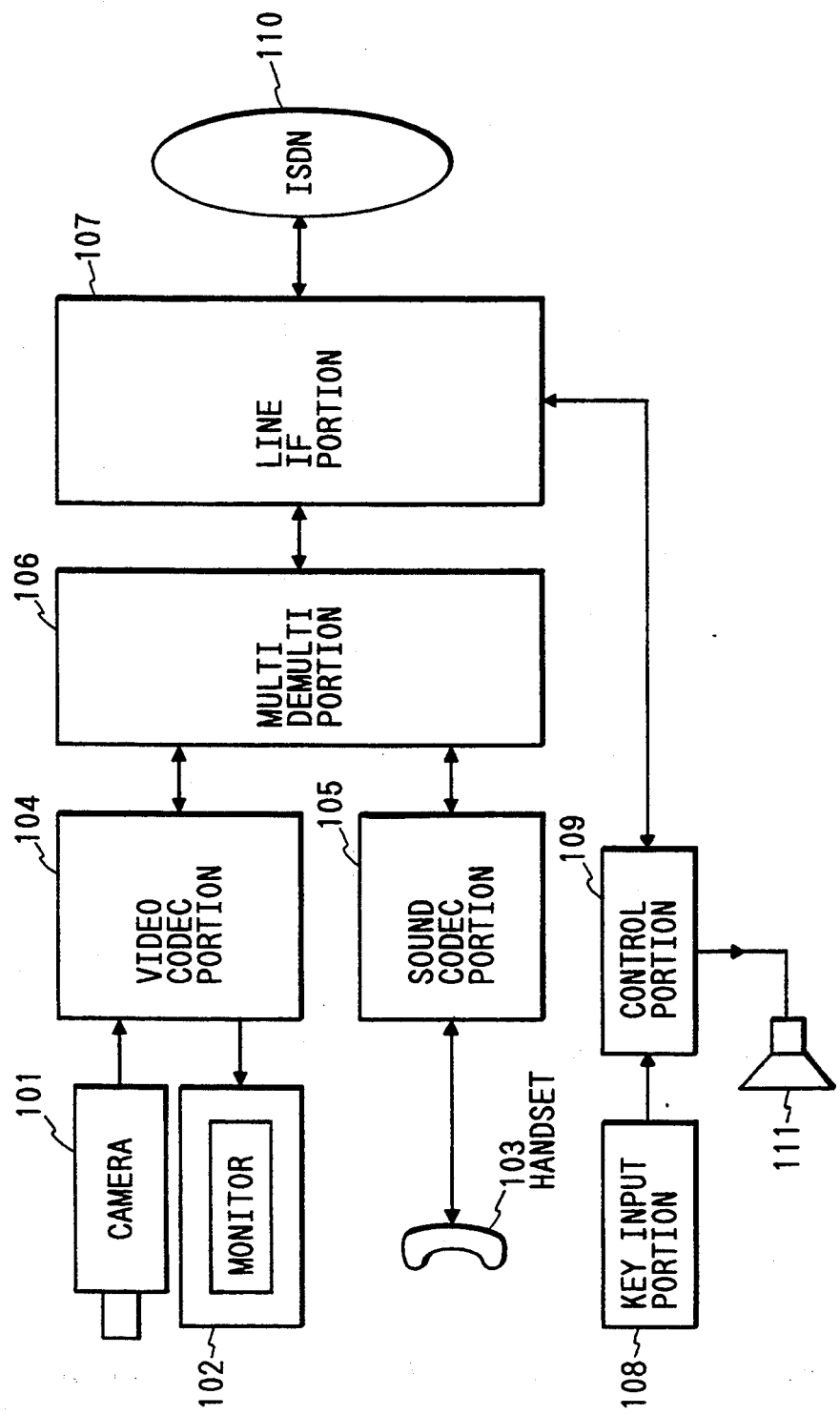
FIG. 17 is a block diagram of a prior art pictorial communication apparatus.
Figure 18:
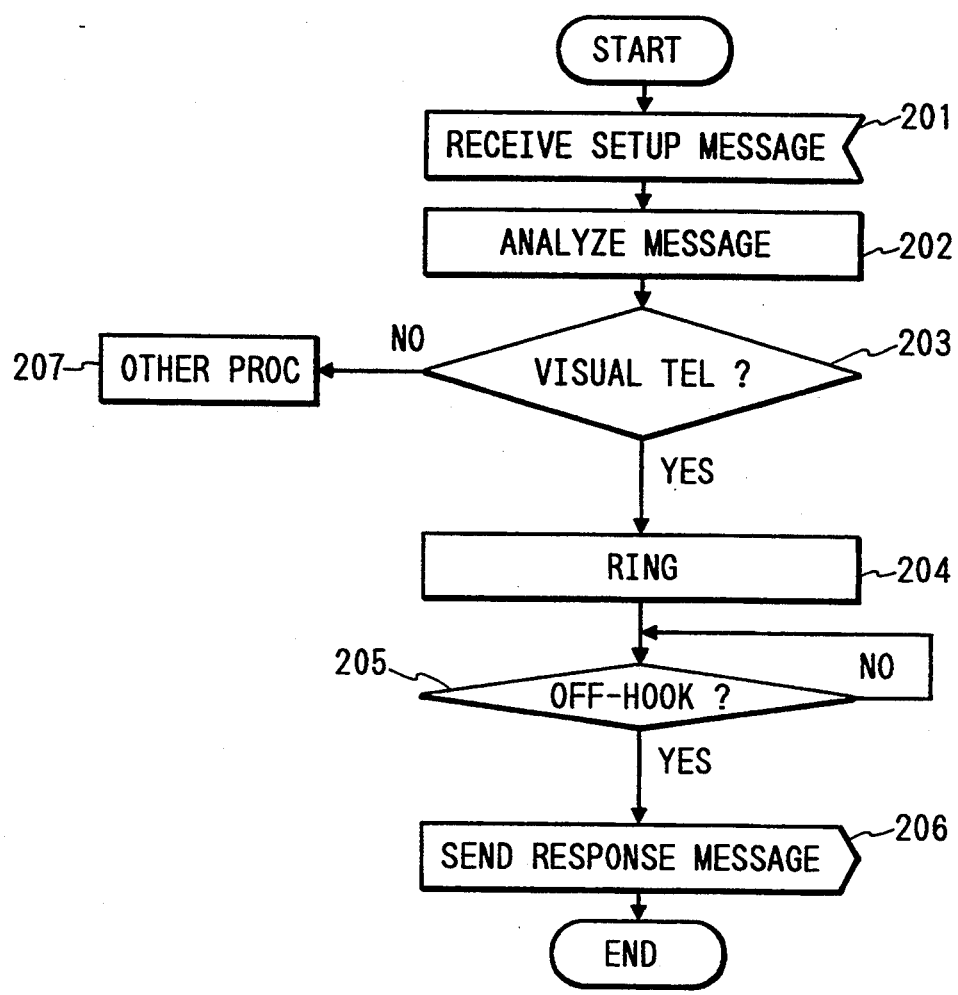
FIG. 18 shows a flow chart showing an operation of the prior art pictorial communication apparatus shown in FIG. 17.

FIG. 16 shows a flow chart of the third embodiment showing an operation mode of the pictorial communication apparatus of the called side in the automatic answering mode. An operation in the normal mode and the character setting operation for automatic answering mode are the same as those of the first embodiment. Therefore, a detailed description of these operations are omitted.

At first, a pictorial communication apparatus of the calling side transmits a setup message to a desired pictorial communication apparatus in step 801. Here, it is assumed that both pictorial communication apparatus of the calling and called parties have the same structure as shown in FIG. 12 for convenience of explanation. The pictorial communication apparatus of the receiving side detects and receives the setup message through the line interface circuit 37 in step 901 (sequence 1). In the following step 902, the control portion 69 analyzes the setup message in step 902. Then, in step 903, the control portion 69 makes a decision as to whether or not the signal which will be transmitted is a pictorial communication signal by checking the setup message. If YES, the control portion 69 reads out a character code data train previously registered from the character information storing portion 71 for the automatic answering In step 904. In the following step 905, the control portion 69 adds the character code data train to an alert message and sends the disconnection message via the line interface circuit 67 to the pictorial communication apparatus of the calling side in step 905 (sequence m). In step 903, if the signal which will be transmitted is a pictorial communication signal, for example, the call is of the conventional telephone call without pictorial communication, the control portion 69 executes other processing to perform the conventional automatic answering response in step 909 and processing returns to step 901.

On the other hand, the pictorial communication apparatus of the calling side receives the disconnection message via line interface circuit 67 in step 802. Then, the control portion 69 analyzes the disconnection message in step 803. The control portion 69 detects and extracts the character code data train from the disconnection message and supplies the extracted character code data train to the display control circuit 75 in step 804. The display control circuit 75 generates or converts a character video signal from the character code data train from the control portion 69 and supplies the character video signal in place of the video signal from the video codec portion 64 to the monitor 62 in step 805 when the control portion 69 detects the character code data train. The monitor 64 displays the character train sent from the pictorial communication apparatus through the alert message.

Then, the control portion 69 of the calling side makes a decision as to whether or not the hook key in the key input portion 68 is in the ON-HOOK condition. If YES, processing proceeds to step 807. If NO, processing waits the ON-HOOK condition. In the step 807, the control portion 69 sends the disconnection message via the line interface circuit 67.

The control portion 69 of the called side receives the disconnection message in step 906 and operates the line interface 67 to release the B channel and sends the release message to the calling side through the D channel in step 907.

In the calling side, when the control portion 69 receives the release message via the line interface circuit 67, the control portion 69 controls the line interface circuit 67 to release the B channel and sends a release acknowledge message to the pictorial communication apparatus of the sending side through the D channel in step 808. Then, in the following step 809, the control portion of the calling side sends the release completion message via the line interface circuit 67 through the D channel in step 809.

The control portion 69 of the called side receives the release completion message in step 908 and finishes this processing and the communication is terminated.

In this embodiment, the pictorial communication of the receiving side transmits the automatic answering message in the state of the character code data train. On the other hand, the pictorial communication apparatus of the sending side analyzes the character code data train and displays the automatic answering message on the monitor 62. Therefore, an amount of data and a transmission interval for sending the message is smaller and shorter than the case that the message is transmitted through the video signal as described in the first embodiment.

Moreover, the pictorial communication apparatus of the called side sends the answering message included in the alert message as character code, so that a storing capacity for storing the character train is smaller than the case where the character would be send as pictorial information.

What is claimed is:

1. A pictorial communication apparatus comprising:
   (a) an interface circuit for transmitting a first pictorial signal and a first control signal and receiving a second pictorial signal and a second control signal through a network;
   (b) detection means for detecting a call by checking said second control signal from said network, said interface circuit making a connection to said network in response to said detected call;
   (c) a memory for storing a character code data train forming a personal message;
   (d) conversion means for converting said character code data train into a character video signal;
   (e) a mode selection switch for selecting between an automatic answering mode and a non-automatic answering mode; and
   (f) control means responsive to said detected call and said mode selection switch for reading said character code data train from said memory, converting said read character code data train into said character video signal by said conversion means, and transmitting said converted character video signal as said first pictorial signal to said network by said interface circuit in said automatic answering mode.

2. A pictorial communication apparatus as claimed in claim 1, further comprising a key input circuit for producing said character code data train and storing said character code into said memory in response to an operator.

3. A pictorial communication apparatus as claimed in claim 1, further comprising:
   (a) a camera unit for taking a picture to produce a video signal;
   (b) a display for displaying an image; and
   (c) second control means for transmitting said video signal as said first pictorial signal to said network by said interface circuit in said non-automatic answering mode and for displaying said image by said display using said second pictorial signal received from said network by said interface circuit in response to said detected call in said non-automatic answering mode.

4. A pictorial communication apparatus comprising:
(a) an interface circuit for transmitting a first pictorial signal and a first control signal and receiving a second pictorial signal and a second control signal through a network;
(b) detection means for detecting a call by checking said second control signal from said network, said interface circuit making a connection to said network in response to said detected call;
(c) a memory for storing a character code data train forming a personal message;
(d) a mode selection switch for selecting between an automatic answering mode and a non-automatic answering mode; and
(e) control means responsive to said detected call and said mode selection switch for reading said character code data train from said memory and transmitting said character code data train as said first control signal to said network by said interface circuit in said automatic answering mode.

5. A pictorial communication apparatus as claimed in claim 4, further comprising a key input circuit for producing said character code data train in response to an operator.

6. A pictorial communication apparatus as claimed in claim 4, further comprising:
(a) character code detection means responsive to said detected call for detecting said character code data train from said second control signal received from said network by said interface circuit;
(b) conversion means for converting said detected character code data train into a character video signal; and
(c) display means responsive to said conversion means for displaying said character video signal in said non-automatic answering mode.

7. A pictorial communication apparatus as claimed in claim 4, further comprising:
(a) a camera unit for taking a picture to produce a video signal;
(b) a display for displaying an image; and
(c) second control means responsive to said detected call for transmitting said video signal as said first pictorial signal by said interface circuit and for operating said display to display said image using said second pictorial signal received by said interface circuit from said network in said non-automatic answering mode.

8. A pictorial communication apparatus comprising:
(a) a camera unit for taking a picture to produce a first pictorial signal;
(b) an interface circuit for transmitting a first pictorial signal, a first control signal, and a first sound signal to said network and receiving a second pictorial signal, a second control signal, and a second sound signal from said network;
(c) detection means for detecting a call by checking said second control signal from said interface circuit, said interface circuit making a connection to said network in response to said detected call;
(d) a display for displaying an image;
(e) a handset for producing said first sound signal in response to a first sound and producing a second sound from said second sound signal;
(f) a memory for storing a character code train forming a personal message;
(g) conversion means for converting said character code train into a character video signal;
(h) a mode selection switch for selecting between an automatic answering mode and a non-automatic answering mode;
(i) first control means responsive to said detected call and an operation signal for making a connection to said network by said interface circuit, for transmitting said first pictorial signal by said interface circuit to said network, and for operating said display to display said image from said second pictorial signal received by said interface circuit from said network in said non-automatic answering mode; and
(j) second control means responsive to said detection means and said mode selection switch for reading said character code data train from said memory and converting said read character code data train into said character video signal by said conversion means, and transmitting said character video signal as said first pictorial signal to the network by said interface circuit in said automatic answering mode.

9. A pictorial communication apparatus as claimed in claim 8, further comprising a key input circuit for producing said character code data train in response to an operator.

10. A pictorial communication apparatus comprising:
(a) a camera unit for taking a picture to produce a first pictorial signal;
(b) an interface circuit for transmitting a first pictorial signal, a first control signal, and a first sound signal to said network and receiving a second pictorial signal, a second control signal, and a second sound signal from said network;
(c) detection means for detecting a call by checking said second control signal from said interface circuit, said interface circuit making a connection to said network in response to said detected call;
(d) a display for displaying an image;
(e) a handset for producing said first sound signal in response to a first sound and producing a second sound from said second sound signal;
(f) a memory for storing a character code train forming a personal message;
(g) a mode selection switch for selecting between an automatic answering mode and a non-automatic answering mode;
(h) first control means responsive to said detected call and an operation signal for making a connection to said network by said interface circuit, for transmitting said first pictorial signal by said interface circuit to said network, and for operating said display to display said image from said second pictorial signal received by said interface circuit from said network in said non-automatic answering mode; and
(i) second control means responsive to said detection means and said mode selection switch for reading said character code data train from said memory and transmitting said character code data train as said first control signal to the network by said interface circuit in said automatic answering mode.

11. A pictorial communication apparatus as claimed in claim 10, further comprising a key input circuit for producing said character code data train in response to an operator.

12. A pictorial communication apparatus as claimed in claim 10, further comprising:
(a) character code detection means responsive to said detected call for detecting said character code data train from said second control signal received from said network by said interface circuit;
(b) conversion means for converting said detected character code data train into a character video signal; and
(c) display means responsive to said conversion means for displaying said character video signal in said non-automatic answering mode.

13. A pictorial communication apparatus comprising:
(a) an interface circuit for transmitting first pictorial information and first control information and receiving second pictorial information and second control information through a digital network;
(b) detection means for detecting a call by checking said second control information from said digital network, said interface circuit making a connection to said digital network in response to said detected call;
(c) a memory for storing a character code data train forming a personal message;
(d) conversion means for converting said character code data train into a character video data;
(e) coding means for coding said character video data;
(f) a mode selection switch for selecting between an automatic answering mode and a non-automatic answering mode; and
(g) control means responsive to said detected call and said mode selection switch for reading said character code data train from said memory, converting said read character code data train into said character video data by said conversion means, coding said character video data by said coding means, and transmitting said coded character video data as said first pictorial information to said digital network by said interface circuit in said automatic answering mode.

14. A pictorial communication apparatus as claimed in claim 13, further comprising a key input circuit for producing said character code data train and storing said character code into said memory in response to an operator.

15. A pictorial communication apparatus as claimed in claim 13, further comprising:
(a) decoding means responsive to said detected call for decoding said second pictorial information received by said interface circuit;
(b) a display for displaying said decoded second pictorial information;
(c) a camera unit for taking a picture to produce a video information;
(d) a display for displaying an image; and
(e) second control means for supplying said video information to said coding means in place of said character video data in said non-automatic answering mode and for displaying said image by said display using said second pictorial information from said decoding means in response to said detected call in said non-automatic answering mode.

16. A pictorial communication apparatus as claimed in claim 13, further comprising: compression means for compressing said video data in cooperation with said coding means.

17. A pictorial communication apparatus as claimed in claim 16, further comprising:
(a) expanding and decoding means responsive to said detected call for expanding and decoding a coded character video data;
(b) a display for displaying said coded character video data from said decoding means;
(c) a camera unit for taking a picture to produce a video information;
(d) a switch for supplying either said character video data from said conversion means in said automatic answering mode or said video information from said camera unit to said coding means in said non-automatic answering mode; and
(e) second control means responsive to said detected call and an operation signal for operating said switch to supply said video information from said camera unit in said non-automatic answering mode.

18. A pictorial communication apparatus comprising:
(a) an interface circuit for transmitting first pictorial information, first control information and receiving second pictorial information and second control information through a digital network;
(b) detection means for detecting a call by checking said second control signal from said digital network, said interface circuit making a connection to said digital network in response to said detected call;
(c) a memory for storing a character code data train forming a personal message;
(d) coding means for coding said character video signal;
(e) a mode selection switch for selecting between an automatic answering mode and a non-automatic answering mode; and
(f) control means responsive to said detected call and said mode selection switch for reading said character code data train from said memory, and transmitting said character code data train as said first control information to said digital network by said interface circuit in said automatic answering mode.

19. A pictorial communication apparatus as claimed in claim 18, further comprising a key input circuit for producing said character code data train in response to an operator.

20. A pictorial communication apparatus as claimed in claim 18, further comprising:
(a) signal producing means responsive to said detected call for producing a connection controlling message used for controlling of a communication between said pictorial communication apparatus and another calling pictorial communication apparatus which transmitted said call; and
(b) signal combining means for combining said connection controlling message and said character code data train from said memory to produce said first control information and for transmitting said first control information to said calling pictorial communication apparatus.

21. A pictorial communication apparatus as claimed in claim 20, wherein said signal producing means produces said connection controlling message for informing detection of said call by said detection means to said calling pictorial communication apparatus.

22. A pictorial communication apparatus as claimed in claim 20, wherein said signal producing means produces said connection controlling message indicating of a request of disconnection from said pictorial communication apparatus.

23. A pictorial communication apparatus as claimed in claim 18, further comprising:
(a) a camera unit for taking a picture to produce a video information;

(b) a display for displaying an image; and (c) second control means for transmitting said video information as said first pictorial information to said digital network by said interface circuit in said non-automatic answering mode and for displaying said image by said display using said second pictorial information received from said network by said interface circuit in response to said detected call in said non-automatic answering mode.

24. A pictorial communication apparatus as claimed in claim 18, further comprising: compression means for compressing said video data in cooperation with said coding means.

25. A pictorial communication apparatus as claimed in claim 24, further comprising:

(a) expanding and decoding means responsive to said detected call for expanding and decoding a coded character video data;

(b) a display for displaying said coded character video data from said decoding means; and (c) a camera unit for taking a picture to produce a video information;

(d) a switch for supplying either said character video data from said conversion means in said automatic answering mode or said video information from said camera unit to said coding means in said non-automatic answering mode;

(e) second control means responsive to said detected call and an operation signal for operating said switch to supply said video information from said camera unit in said non-automatic answering mode.

26. A pictorial communication apparatus as claimed in claim 18, further comprising:

(a) character code detection means responsive to said detected call for detecting said character code train from said network via said interface circuit;

(b) conversion means responsive to said character code detection means for converting said character code train into a character video signal; and (c) second control means responsive to said conversion means for operating said display unit to display said character video signal in said non-automatic answering mode.

27. A pictorial communication apparatus comprising:

(a) an interface circuit for transmitting a first pictorial-and-sound information and a first control information to a digital network and receiving second pictorial-and-sound information and second control information from said digital network;

(b) detection means for detecting a call by checking said second control information from said interface circuit, said interface circuit making a connection to said digital network in response to said detected call;

(c) a mode selection switch for selecting between an automatic answering mode and a non-automatic answering mode;

(d) a camera unit for taking a picture to produce a first pictorial information;

(e) a memory for storing a character code data train forming a personal message;

(f) conversion means for converting said character code train into character video data;

(g) a switch circuit for supplying said first pictorial information in said non-automatic answering mode and said character video data in said automatic answering mode;

(h) video coding means for coding an output of said switch circuit to produce a coded video information;

(i) sound inputting means for producing sound information in response to a sound;

(j) sound coding means for coding said sound information;

(k) multiplexing means for multiplexing said coded video information and said coded sound information to supply said first pictorial-and-sound signal to said interface circuit;

(l) demultiplexing means for separating said second pictorial-and-sound information from said interface circuit into second pictorial information and second sound information;

(m) video decoding means for decoding said second pictorial information;

(n) sound decoding means for decoding said second sound signal;

(o) sound generation means for generating a second sound from said second sound signal from said sound decoding means;

(p) first control means responsive to said detected call and an operation signal for making a connection to said digital network by said interface circuit, for producing said first pictorial-and-sound information from said first pictorial information from said camera via said switch, said video coding means, said sound inputting means, said sound coding means, and said multiplexing means, for transmitting said first pictorial-and-sound information to said digital network by said interface circuit, for operating said display to display said image from said second pictorial information received by said interface circuit from said digital network via said demultiplexing means and said video decoding means in said non-automatic answering mode, and for operating said sound generation means to generate said second sound from said second sound information received by said interface circuit from said digital network via said demultiplexing means, and said sound decoding means in said non-automatic answering mode; and (q) second control means responsive to said detection means and said mode selection switch for reading said character code data train from said memory and producing said first pictorial-and-sound information from said character code data train read from said memory using said switch circuit, said video coding means, said sound inputting means, said sound coding means, and said multiplexing means, and for transmitting said first pictorial-and-sound information to said digital network by said interface circuit in said automatic answering mode.

28. A pictorial communication apparatus as claimed in claim 27, further comprising a key input circuit for producing said character code data train in response to an operator.

29. A pictorial communication apparatus as claimed in claim 27, further comprising:

(a) video compression means for compressing said output of switch circuit in cooperation with said coding means;

(b) video expanding and decoding means responsive to said detected call for expanding and decoding said pictorial information from said demultiplexing means; and (c) a display for displaying said pictorial information from said expanding and decoding means.

30. A pictorial communication apparatus as claimed in claim 27, further comprising:
   (a) sound compression means for compressing said sound signal in cooperation with said sound coding means; and
   (b) sound expanding and decoding means responsive to said detected call for expanding and decoding said second sound signal from said demultiplexing means.

31. A pictorial communication apparatus comprising:
   (a) an interface circuit for transmitting a first pictorial-and-sound information and a first control information to a digital network and receiving second pictorial-and-sound information and second control information from said digital network;
   (b) detection means for detecting a call by checking said second control information from said interface circuit, said interface circuit making a connection to said digital network in response to said detected call;
   (c) a mode selection switch for selecting between an automatic answering mode and a non-automatic answering mode;
   (d) a camera unit for taking a picture to produce a first pictorial information;
   (e) a memory for storing a character code data train forming a personal message;
   (f) video coding means for coding an output of said switch circuit to produce a coded video information;
   (g) sound inputting means for producing sound information in response to a sound;
   (h) sound coding means for coding said sound information;
   (i) multiplexing means for multiplexing said coded video information and said coded sound information to supply said first pictorial-and-sound signal to said interface circuit;
   (j) demultiplexing means for separating said second pictorial-and-sound information from said interface circuit into second pictorial information and second sound information;
   (k) video decoding means for decoding said second pictorial information;
   (l) sound decoding means for decoding said second sound signal;
   (m) sound generation means for generating a second sound from said second sound signal from said sound decoding means; and
   (n) control means responsive to said detection means and said mode selection switch for reading said character code data train from said memory and transmitting said character code data train to said digital network in said automatic answering mode.

32. A pictorial communication apparatus as claimed in claim 31, further comprising a key input circuit for producing said character code data train in response to an operator.

33. A pictorial communication apparatus as claimed in claim 31, further comprising:
   (a) signal producing means responsive to said detected call for producing a connection controlling message used for controlling of a communication between said pictorial communication apparatus and another calling pictorial communication apparatus which transmitted said call; and
   (b) signal combining means for combining said connection controlling message and said character code data train from said memory to produce said first control information and for transmitting said first control information to said calling pictorial communication apparatus.

34. A pictorial communication apparatus as claimed in claim 31, wherein said signal producing means produces said connection controlling message for informing detection of said call by said detection means to said calling pictorial communication apparatus.

35. A pictorial communication apparatus as claimed in claim 31, wherein said signal producing means produces said connection controlling message indicating of a request of disconnection from said pictorial communication apparatus.

36. A pictorial communication apparatus as claimed in claim 31, further comprising:
   (a) video compression means for compressing said input pictorial signal in cooperation with said coding means;
   (b) video expanding and decoding means responsive to said detected call for expanding and decoding said pictorial information from said demultiplexing means; and
   (c) a display for displaying said pictorial information from said expanding and decoding means.

37. A pictorial communication apparatus as claimed in claim 27, further comprising:
   (a) video compression means for compressing said input pictorial signal in cooperation with said coding means;
   (b) video expanding and decoding means responsive to said detected call for expanding and decoding said pictorial information from said demultiplexing means; and
   (c) a display for displaying said pictorial information from said expanding and decoding means.

38. A pictorial communication apparatus as claimed in claim 31, further comprising:
   (a) character code detection means responsive to said detected call for detecting said character code data train from said network via said interface circuit;
   (b) conversion means responsive to said character code detection means for converting said character code train into a character video signal; and
   (c) second control means responsive to said conversion means for operating said display unit to display said character video data in said non-automatic answering mode.

* * * * *